United States Patent [19]
Fuller

[11] Patent Number: 5,818,512
[45] Date of Patent: *Oct. 6, 1998

[54] VIDEO DISTRIBUTION SYSTEM

[75] Inventor: William H. Fuller, Plano, Tex.

[73] Assignee: SpectraVision, Inc., Richardson, Tex.

[ * ] Notice: The term of this patent shall not extend beyond the expiration date of Pat. No. 5,729,297.

[21] Appl. No.: 835,136

[22] Filed: Apr. 4, 1997

Related U.S. Application Data

[63] Continuation of Ser. No. 378,616, Jan. 26, 1995, Pat. No. 5,729,279.

[51] Int. Cl.$^6$ .................................................. H04N 7/173
[52] U.S. Cl. .................................. 348/8; 348/7; 348/584; 348/589
[58] Field of Search .................................... 348/384, 390, 348/409, 410, 412, 571, 578, 584, 589, 588, 720, 721, 722, 723, 6, 7, 8, 9, 12, 13, 385–387; 370/58.1, 60, 61, 69.1, 73, 124, 85.7, 91, 92, 93, 94.1, 95.1; 382/222, 233, 235; 395/153, 154; 375/240, 241, 257; 380/15, 20

[56] References Cited

U.S. PATENT DOCUMENTS

| | | |
|---|---|---|
| 4,218,710 | 8/1980 | Kashigi et al. . |
| 5,305,107 | 4/1994 | Gale et al. .............................. 348/584 |
| 5,442,700 | 8/1995 | Snell et al. .................................. 380/15 |
| 5,448,307 | 9/1995 | Gilissen et al. .......................... 348/584 |
| 5,463,728 | 10/1995 | Blahut et al. . |
| 5,729,279 | 3/1998 | Fuller .......................................... 348/8 |

FOREIGN PATENT DOCUMENTS

| | | | |
|---|---|---|---|
| 0624040 | 11/1994 | European Pat. Off. ....... | H04N 7/173 |

OTHER PUBLICATIONS

International Organization for Standardization, Information Technology—Coding of Moving Pictures and Associated Audio for Digital Storage Media Up to About 1.5 Mbits/s; 1992 pp. 1–337.

*Primary Examiner*—David E. Harvey
*Attorney, Agent, or Firm*—Haynes and Boone, L.L.P.

[57] ABSTRACT

An interactive video services system for enabling store and forward distribution of digitized video programming comprising merged graphics and video data from a minimum of two separate data storage devices is disclosed. In a departure from the art, an MPEG converter operating in tandem with an MPEG decoder device that has buffer capacity merges encoded and compressed digital video signals stored in a memory of a video server with digitized graphics generated by and stored in a memory of a systems control computer. The merged signals are then transmitted to and displayed on a TV set connected to the system. In this manner, multiple computers are able to transmit graphics or multimedia data to a video server to be displayed on the TV set or to be superimposed onto video programming that is being displayed on the TV set.

19 Claims, 6 Drawing Sheets

VIDEO DISTRIBUTION SYSTEM

This is a continuation of application Ser. No. 08/378,616 filed on Jan. 26, 1995, now U.S. Pat. No. 5,729,279.

FIELD OF THE INVENTION

The present invention relates generally to video distribution systems and, more specifically, to a method and an apparatus for mixing and transmitting data from remote data storage devices for digital video imaging distribution.

BACKGROUND OF THE INVENTION

It is well known that hospitality establishments, herein defined as hotels, motels, hospitals, condominiums and the like, operate in a highly competitive environment. In order to attract customers and generate additional revenue, such hospitality establishments often offer a wide variety of services, including an assortment of video entertainment services. In addition to broadcast and cable television, hotels and motels often have video services systems that offer pay-per-view and video-on-demand services, as well as a variety of interactive services. Pay-per-view services are scheduled movie services that generally utilize analog video cassette players installed in a remote location within the facility. The cassette players are preloaded with selected video cassette tapes to be broadcast at predetermined, or scheduled, times. The programming can be accessed by multiple television sets (TVs) at any given time while the transmission is in progress.

Video-on-demand services enable customers to select a program to be viewed at their convenience. Viewing times are not prescheduled and customers are given a choice of a large number of programming alternatives, typically between eight (8) and fifty (50). The selected programming is usually transmitted in such a manner that only the customer that selected the programming is able to receive the broadcast. Alternatively, some video-on-demand systems provide join-in-progress capability, such that other customers also may view the selected programming. As with pay-per-view, the programming is stored on analog video cassette tapes.

A video-on-demand system may include a robotic device that removes the video tape containing the selected programming from a storage rack and places it in one of several appropriate video cassette players. Alternatively, the system may include a designated video cassette player for each video cassette tape. The customer's selection of a particular program activates only the video cassette player containing the desired programming.

Despite the capability of the prior art video services systems, it has become clear that advancements in the art are needed for many reasons. For example, delivery of the video cassette tapes for pay-per-view and video-on-demand services, as well as the maintenance and upkeep for the video cassette players, is labor intensive and costly. In almost all cases, the video services system that provides pay-per-view and video-on-demand programming, as well as broadcast and cable television, is owned and managed by a specialist company, for example, SpectraVision, Inc., and not by the hospitality establishment. This specialist company typically delivers the video cassette tapes for the pay-per-view and video-on-demand services and maintains the video cassette players. It would not be uncommon for a specialist company to provide six (6) to eight (8) pay-per-view movies and change all of them at least once a month. As previously indicated, video-on-demand systems may offer fifty (50) or more movies, only twenty percent (20%) of which will typically be changed out in a given month. Typically, an employee of the company that owns and manages the video services system drives to the facility with the video tapes, loads them into the video cassette players, and takes the old tapes back. If the establishment is at an isolated location, the industry standard is to mail the cassette tapes and have the hospitality establishment mail the old tapes back "cash on delivery" (COD). Clearly, regardless of the method used to change out the tapes, a not insignificant expense is incurred by either the hospitality establishment or the management company in doing so.

Methods of compressing and encoding digital video signals and delivering encoded and compressed digital video signals to a set top converter by a communication means are well known in the art. The set top converter decodes and decompresses the signals and converts them to National Television Standards Committee (NTSC) signal format for delivery to the TV. Methods of storing encoded and compressed digital video signals in a computer referred to as a "video server," as well as methods of transmitting data via satellite, are also well known in the art. Other video delivery systems, such as that described in U.S. Pat. No. 4,947,244 to Fenwick et al., transmit standard, radio frequency analog signals to room televisions from traditional, mechanical video tape players.

Analog systems, such as described in Fenwick et al., do not anticipate the integration of digital video servers or the reception of video programming from a remote centralized video source. In addition, such systems do not permit customers to interact with video programming using video cassette recorder (VCR) type commands and do not anticipate the integration of payment facilities, such as in-room magnetic card stripe readers. Finally, although digital video distribution systems that utilize digital video servers, such as those described in U.S. Pat. Nos. 5,133,079, 5,172,413 and 5,130,792 to Ballentyne, Bradley and Tindell, respectively, are being implemented, such systems require the addition of sophisticated switching systems, such as asynchronous transfer mode switches, new transmission networks, and set top units that can decode the transmissions to existing video distribution networks.

Accordingly, the foregoing arrangements suffer clear deficiencies because the hospitality market requires access to video server technology without the expense of additional switches, networks and set top units mentioned above and without waiting for other entities, such as local television companies and cable television companies, to test and implement complimentary new systems.

Another shortcoming of existing systems is the limited number of channels, or users that may be operating on the system at any one time. When a hospitality facility requires more than sixteen (16) channels for interactive programming, the video distribution system must include additional control computers, each with a full number of graphics cards. The necessity of including additional computers greatly increases the cost of the system. In addition, with present video distribution systems, separate sets of frequency modulators, analog multiplexers, and radio frequency (RF) connections are required to connect both the video server and the systems control computer to the video distribution network, thereby duplicating hardware, software and functionality. Elimination of these duplications would significantly reduce the cost of installing and maintaining the video distribution systems. Moreover, with the implementation of interactive programming and video-on-demand services, hospitality establishments require methods to increase the channel capacity of their networks without incurring the expense of rebuilding or transforming the existing master antenna television (MATV) system.

In addition, hospitality video distribution systems are presently unable to overlay, or superimpose, graphic screens or animation (video and audio) created by the systems control computer onto full motion video programming generated by the video server. This is because the systems control computer and the video server have separate access points onto the video distribution network, making their separate programming incompatible and preventing the susperimposition of the transmissions. Overlay capability is desirable because it could enable the video distribution system to transmit advertisements, consumer instruction subtitles, sophisticated interactive programming or the like to be merged in real time with the transmission of traditional video programming to the hospitality customer.

Finally, it is recognized that cable television companies and telephone operating companies will install networks and remote video servers that can be accessed by residential customers for video-on-demand programming. Likewise, in some metropolitan settings, hospitality video services providers may choose to utilize video servers from centralized locations to provide video-on-demand and other unique promotional services. As these systems are implemented, there will be a growing need for the capability to transmit computer generated graphics screen data and interactive video and audio data from remote computers to a video server for transmission to a customer's TV. Additionally, sophisticated service providers will want the capability to cost effectively superimpose computer generated screens over the video programming.

Therefore, what is needed, and what has heretofore been lacking in the art, is an effective method and system for enabling computer generated screens to be merged with other video programming and for delivering encoded and compressed digital signals to customers of hospitality establishments using a video services system.

SUMMARY OF THE INVENTION

The foregoing problems are solved and a technical advance is achieved by an interactive video services system for enabling store and forward distribution of digitized video programming comprising merged graphics and video data from a minimum of two separate data storage devices. In a departure from the art, a Motion Picture Experts Group (MPEG) format converter operating in tandem with an MPEG decoder device that has buffer capacity merges encoded and compressed digital video signals (such as video entertainment programming, i.e., Movies) stored in a memory of a video server with digitized graphics (i.e., advertisements, subtitles, instructions, or other programming) generated by and stored in a memory of a systems control computer. The merged signals are then transmitted to and displayed on a TV set in a customer's room.

In a preferred embodiment, an interactive video services system of the present invention includes a plurality of integrated receiver decoders (IRDs), a systems control computer and a video server computer, all of which are located at the hospitality establishment. The video services system further comprises an MPEG converter connected between the systems control computer and the video server, as well as an MPEG decoder with buffer capability, which resides in the video server. The IRDs are connected to a satellite down link facility of the hospitality establishment to receive and deliver real-time video and audio transmissions from the satellite downlink facility to the hospitality establishment's master antenna TV (MATV) system, to be accessed by customers via in-room TVs. In addition, the IRDs receive and deliver encoded, compressed video programming signals from the downlink facility to the video server computer and are also capable of receiving and delivering other types of data signals from the downlink facility to the systems control computer, via an intelligent radio frequency (RF) modem, for providing advanced video services. The systems control computer provides the logic support for the video services system, including the video server, and is capable of storing and generating digitized audio, video, and graphic data for broadcast to and display on one or more of a plurality of TVs located in customer rooms of a hospitality establishment. The computer receives programming requests from customers and transmits commands to the video server or some other video source. The systems control computer is connected to the room terminals and TVs via an RF or digital video distribution network. In a preferred embodiment, the video server is capable of storing a minimum of twenty (20) feature length video programs (i.e., movies) for video-on-demand and pay-per-view viewing by an establishment's customers. It is also capable of storing digitized advertisements. The video server receives MPEG encoded, compressed video program data from the IRDs via an RS-449 opportunistic data link or a full bandwidth link, for example. The encoded data is stored on a hard disk array within the video server. Once a movie is selected, the associated video data is converted from a standard MPEG format, for example, MPEG 1, MPEG 2 or some derivative thereof, into an RF format and is transmitted to the appropriate in-room TV(s) via the property's MATV network.

In a particular customer room of the establishment, a customer utilizes a TV remote control unit, the room TV and the room terminal to access the video services system and order video-on-demand services. Typically, the customer will choose programming from a menu of choices. The customer inputs the selection utilizing the remote control unit or a keyboard on the room terminal. The room terminal functions as a modem and transmits the selection to the systems control computer. The room terminal also prevents unauthorized viewing of the programming.

In one aspect of the invention, the MPEG converter is capable of encoding, multiplexing, and superimposing data stored on and output by one storage device, typically within the systems control computer, onto data stored within and output by a separate storage device, typically the video server. The MPEG converter, operating in tandem with an MPEG decoder device with buffer capacity, is capable of merging digitized graphics and video data from a minimum of two separate data storage devices, while the data is being transmitted to consumers' TV sets. Typically, the data storage devices are the systems control computer, which stores and generates graphics screens, animation, and short audio/video programming, and the video server, which stores both short and full length audio/video programming, although both storage devices could be video servers.

The graphics, video and/or animation data stored in and generated by the systems control computer are written to the MPEG converter in the same manner a computer would write or map graphics data to a graphics display circuit board, such as a video graphics array (VGA) circuit board. The MPEG converter encodes these data screens according to standards established by the Motion Pictures Experts Group (MPEG), copies the data to a transmission interface and transmits the data to the decoder device with screen buffer capability. The MPEG converter can be configured to encode data according to either the MPEG-1 standards or the recently formed MPEG-2 standards, although the MPEG converter also could be used to encode data according to other industry data encryption standards that may be presently utilized or utilized in the future. In any event, the data is encoded in a manner that allows it to be superimposed or merged at the decoder device's buffer with similarly encoded data being transmitted from the video server's data storage device, typically, a hard disk array. Data screens that are temporarily stored in the buffer of the decoder device are then transmitted and displayed on consumers' television sets.

In one aspect of the present invention, the MPEG converter is able to emulate the capabilities of existing VGA circuit boards, as well as the functions of lesser quality graphics interfaces, such as EGA and CGA circuit boards. Because of the flexibility of the design as disclosed herein, the MPEG converter simulates the hardware registers and "handshake" protocols of such circuit boards. In addition, the MPEG converter can be used with most computer operating systems and graphics software programs. The data for the graphic screens, animation, and/or digitized video screens actually are written, or mapped, directly to the MPEG converter's resident random access memory (RAM) by the systems control computer in the same manner that graphic screens are written to the memory of a VGA circuit board.

The MPEG converter also has multichannel capability, such that it is capable of writing and outputting multiple screens to multiple output channels. The completed screen then is encoded and compressed by the MPEG converter.

Unlike prior art MPEG encoder units, which are unable to overlay data screens over data screens being transmitted from other video sources and which are unable to process multiple data screens for multiple channels, the MPEG converter of the present invention is capable of processing multiple screens for multiple channels and therefore can also function as a digital switch for the systems control computer by directing the appropriate screen to the correct channel and that channel's MPEG decoder unit. Characteristically, a graphics software driver of the systems control computer writes the graphics display data to the MPEG converter via one of thirty-two channels that can be processed by the MPEG converter. The MPEG converter's on-board processor encodes the data on the given channel. The data then is copied to a data output interface on a specific channel wherein the data is transmitted to the video server's MPEG decoder boards.

In a preferred embodiment, the MPEG converter comprises a circuit board installed in a graphics port of the systems control computer. The MPEG converter is connected to the video server via a Small Computer System Interface-2 (SCSI-2) bus of the video server. The SCSI-2 bus is capable of transmitting data at rates up to ten (10) megabytes per second. The SCSI bus architecture allows for multiple master devices to drive the SCSI bus. Thus the systems control computer could operate as a SCSI-2 master driver for the purpose of transferring an MPEG encoded screen to one of the video server display devices. The processor of the video server also would serve as a driver for the SCSI-2 bus. The MPEG converter also can transmit encoded data to the video server over other transmission means.

Alternatively, the MPEG converter can be a "stand alone" unit connectable to the systems control computer by one of several transmission means and connectable to the video server via a SCSI-2 bus. Likewise, the MPEG converter can reside as part of a video server, connectable to the video server's internal SCSI-2 bus. With these embodiments, the MPEG converter would receive the data from systems control computer via a transmission means. With both alternatives, the systems control computer transmits primitives to the MPEG converter for the creation of the graphics images within the RAM memory resident on the MPEG converter. Typically, this functionality would be accomplished with the network transport layer of a graphics software program such as X-Windows. This embodiment would be useful particularly in instances where the video server resides in a centralized location and receives computer generated data from numerous remote computers. It is possible that each remote computer could be operated by a different service provider.

As described herein, the data for video-on-demand programming typically is stored on the video server's disk array encoded in MPEG format. When a program is selected, the data is copied from the disk array to MPEG decoder circuit boards via the video server's internal SCSI-2 bus. Likewise, the MPEG data from the MPEG converter is transmitted via the SCSI-2 bus directly to the buffer of a MPEG decoder circuit board. The data then is decoded and, as described above, transmitted as baseband video signals, via the video distribution system, to the customer's room unit and TV. Typically, the data is erased from the MPEG decoder circuit board once the board receives new data.

It should be noted that any portion of the systems control computer's originating graphic screen could remain displayed if the subsequent MPEG data displayed on the same channel contained a group of pictures defined to encompass something less than the entire screen. Formatted in this manner, the screen generated by the systems control computer could have full motion video and sound overlaid upon it. The data from the two separate data storage devices actually are combined at the decoder buffer during transmission to the TV. In this manner, the systems control computer can transmit advertisement screens, for example, superimposed over sections of audio/video entertainment, such as movies, stored in the video server.

In another aspect of the invention, the systems control computer also can store subtitles for the movies in a wide variety of languages, including English. Customers can select the desired language and the graphic screens with the subtitles are overlaid over the audio/video signals from the movie stored within the video server. Data files for the subtitles and the systems control computer must also include synchronization and timing algorithms and data to assure that the subtitle is merged appropriately with the video programming. Likewise, video programming filmed twice from slightly different spacial perspectives can be stored in two separate data storage devices. The spacial perspectives are chosen such that, if the programming is merged, the resulting images appear three dimensional. The MPEG converter functionality enables the programming to be merged as it is being transmitted to the TV to be viewed by a customer. Numerous other applications also are available with this technology, including applications that require superimposing computer-generated animation for games and other applications over audio/video programming stored in a video server.

Because the computer generated graphics data are transmitted first to the video server, data from the systems control computer and the video server are multiplexed onto the same channels. It is known in the art that the systems control computer uses as many as sixteen (16) to twenty-one (21) channels to transmit computer-generated graphics screens and interactive programming. Multiplexing the data from a single source enables these channels to be used for other purposes, i.e., other types of revenue generated programming. Likewise, because the systems control computer and the video server utilize common transmission facilities, duplicated components, such as frequency modulators and transmission means, are eliminated.

In another aspect of the invention, the room unit will have processing capability and can receive and decode digital signals transmitted from the video server. The buffer utilized for superimposing the data from the various data storage devices also would reside in the room unit. The video server would no longer require MPEG decoder units and would be replaced with digital frequency modulators. This embodiment would provide a significant increase the consumers' capability to receive and interact with data from a variety of sources, including a wide variety of computer generated, interactive programs.

In another aspect of the invention, the video server operates at a centralized location, away from the facilities utilizing its services, and provides video services for residential customers as well as hospitality facilities. Instead of an architecture with a single systems control computer, the video server receives graphic, audio and video data from numerous remote computers via the MPEG converter technology. These remote computers can be operated by a variety of service providers. For example, service providers can include advertisers, video game providers, or the like. Data from remote computers transmitted to the MPEG converter are encoded into MPEG format. The MPEG converter has utility should standards be established and implemented for high definition television (HDTV). The MPEG converter enables computer generated graphics to be formatted in a manner that the data could be multiplexed onto a channel with other television program material and transmitted directly to the consumers' HDTVs.

In yet another aspect of the invention, the MPEG buffer and decoder functionalities are removed from the video server and are incorporated into the systems control computer or can form one or more stand alone units. The video server functions as an adjunct to the systems control computer, comprising little more than a disk array for storing encoded video programming. The data encoded by the MPEG converter still is transmitted to the MPEG buffer and decoder units to be multiplexed onto the transmission network.

In still another aspect of the invention, the MPEG converter is utilized to multiplex and overlay graphic, animation, and/or audio/video data that is stored in a minimum of two video servers.

A technical advantage achieved with the invention is that data for graphics, animation, and/or audio and video may be digitally multiplexed with video and audio data from a separate source, forming a seamless merger of data from the two sources. Typically, one data source is a computer that stores and generates graphics, video, and audio data and the other data source is a video server.

A further technical advantage is that the data from both data sources is processed using the same buffers, decoder circuit boards and frequency modulators, thus eliminating duplicated hardware and software.

A further technical advantage is that the data from both data sources is transmitted from the common buffer and decoder device to the establishment's video distribution network via the same transmission arrangement, thus eliminating duplicated transmission facilities.

A further technical advantage is that the MPEG converter is capable of encoding computer-generated data into an MPEG or MPEG II format.

A further technical advantage is that it enables computer generated data and video program data to be merged so that the room television set displays the graphics image superimposed over the video program images and sound.

A further technical advantage is that the MPEG converter is capable of forming and encoding multiple data screens for output onto multiple channels.

A further technical advantage is that the MPEG converter can be utilized by numerous computer operating systems and graphics software programs.

A further technical advantage is that it is capable of emulating the functionality of numerous, dissimilar graphics and video circuit boards.

A further technical advantage is that it enables consumers to interact with the computer generated graphics screens and multimedia presentations that have been superimposed over the video programming.

A further technical advantage is it enables multiple computers to transmit graphics or multimedia data to a video server for to be displayed on the customer's television set or to be superimposed onto video programming that is being displayed on the customer's television set.

A further technical advantage is it enables subtitles for video programming and the video programming, each residing in separate data storage devices, to be merged while being transmitted to a consumer.

A further technical advantage is that it is capable of interfacing with a digital television set-top unit for the purpose of displaying memory-intensive, interactive computer-generated data.

DETAILED DESCRIPTION OF THE INVENTION

Figure 1:
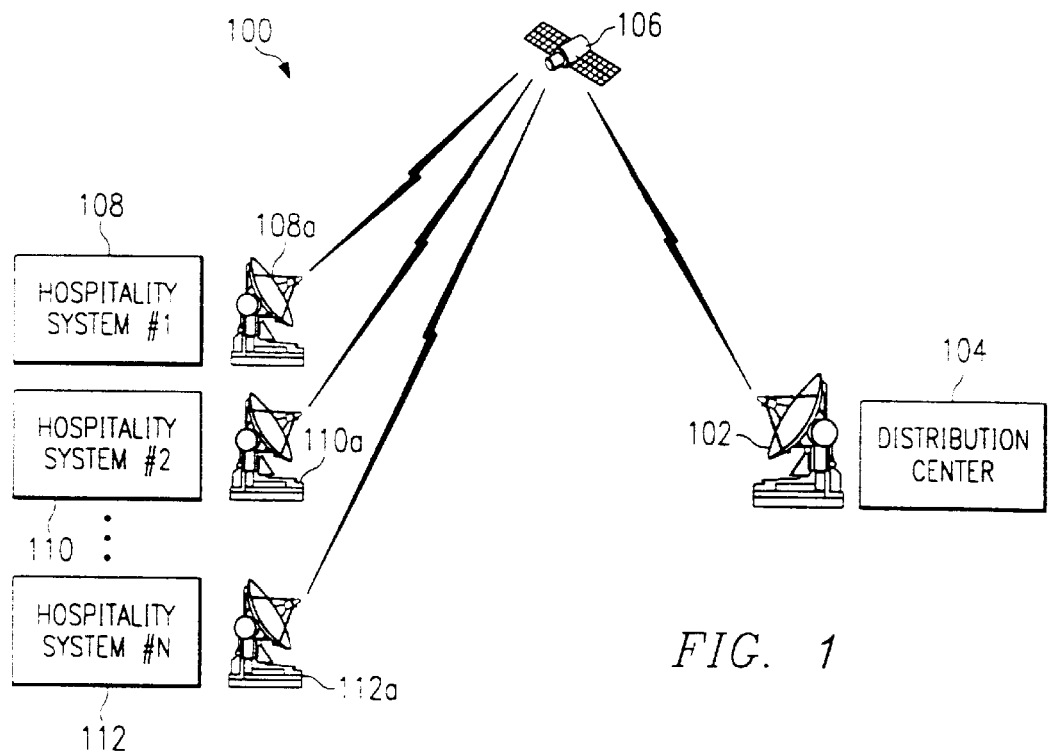
FIG. 1 is a block diagram of a centralized distribution center and satellite delivery network for use in implementing the system of the present invention.

In FIG. 1, the reference numeral 100 refers to a satellite communication system 100. The system 100 includes an uplink facility 102 for transmitting encoded and compressed digital video programming signals stored in a distribution center 104 to a satellite 106. Once received by the satellite 106, the video data signals are relayed to equipment within a plurality of hospitality establishments, which in the illustrated embodiment are represented by hospitality systems 108, 110 and 112. In the illustrated embodiment, each of the systems 108, 110 and 112 has its own downlink facility 108a, 110a and 112a, respectively, it being understood that in an alternative embodiment, multiple hospitality establishments can share downlink facilities. It is understood the system 100 may be used, for example, to transmit digitized, encoded programming from one or more central locations to satellite 106, which then re-transmits the programming to numerous remote hospitality establishments throughout the world.

In a preferred embodiment, the digital programming is encoded according to standards set by the Motion Picture Experts Group (MPEG); however, other encoding and compression standards, including proprietary standards, could also be utilized. In the illustrated embodiment, the encoded data is converted to microwave radio signals and is transmitted from the uplink facility 102 to the satellite 106. In addition, "real-time" video programming and other digitized data can be transmitted simultaneously, utilizing the uplink facility 102 and satellite 106, to the plurality of hospitality systems 108, 110, 112.

Figure 2:
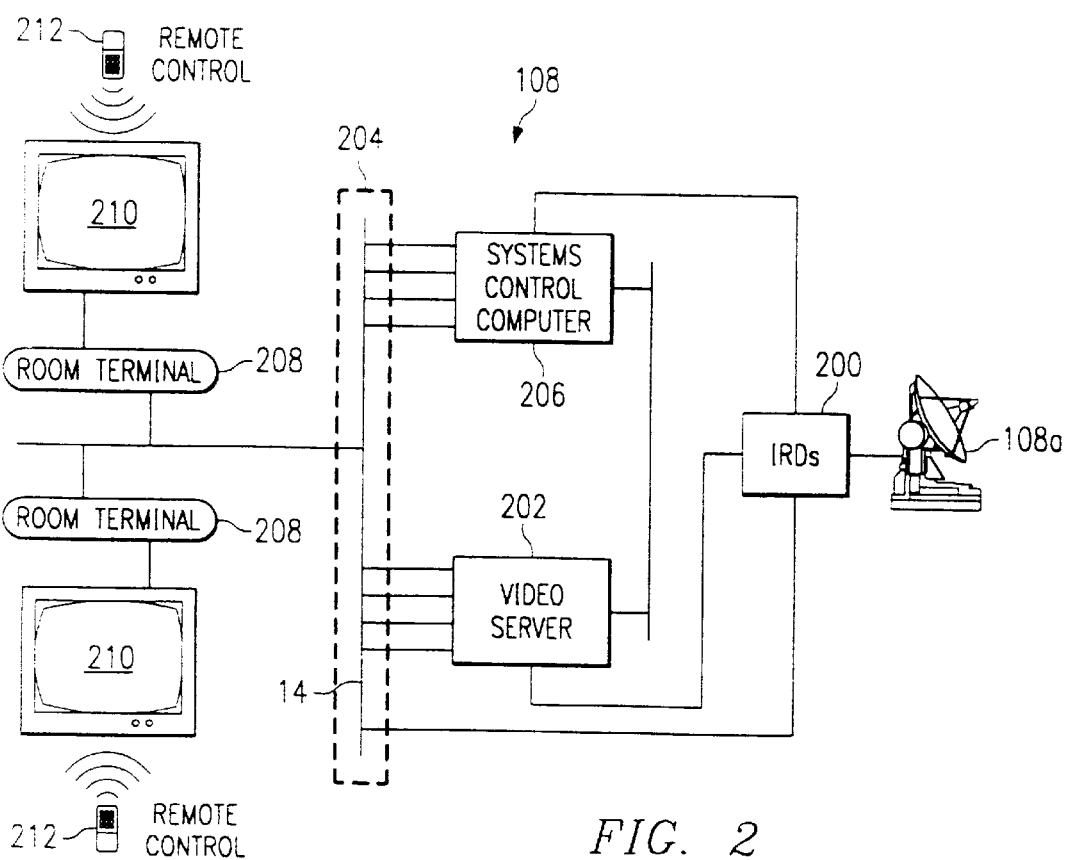
FIG. 2 is a block diagram of a video services system embodying features of the present invention.

FIG. 2 illustrates details of the hospitality system 108, it being understood similiar details comprise the other systems 110 and 112. In FIG. 2, video program data transmitted via the satellite 106 is received by the downlink facility 108a (FIG. 1). The received video data is transmitted to a plurality of integrated receiver decoders (IRDs) 200 for determining the type of programming comprising the data, based on header information, the type of encoding scheme utilized and/or the frequency range of the received video data, and then processing and routing the data accordingly, as will be subsequently described. For example, if the received video data is encoded utilizing the MPEG-2 format, it is transmitted to a video server 202. If the video data is encoded utilizing a proprietary coding scheme, it is decoded, decompressed, and converted to RF signals for transmission on a distribution network 204 of the hospitality system 108 as "real-time" video programming. If the data being processed is non-video data, or if the data is for "barker screens" or audio/video advertisements, the data is transmitted to a systems control computer 206. Typically, the systems control computer 206 receives data such as operating system updates, on-screen movie menus, synopses of the video-on-demand programming, and advertisements graphics. Advertisements may also be stored in the video server 202. Likewise, if the data falls within a predetermined frequency range, it is determined to be a certain program for real-time transmission. Data in another predetermined frequency range is considered a separate program. Both the video server 202 and the systems control computer 206 are connected to a plurality of room terminals 208, and a plurality of in-room TVs 210, by the video distribution network 204. Typically, the network 204 is a radio frequency (RF) network, in which data is transmitted in a RF format to the room terminal 208 via the network 204. Data also could be transmitted via video distribution network 204 in a digital format. Moreover, it is possible that the network 204 could be constructed using fiber optical cable. Often, the video distribution network 204 is configured in a trunk/branch structure. In smaller establishments, numerous branches of coaxial cable connect to a single trunk, while larger hospitality establishments may have a plurality of trunks, each of which may be associated with a particular floor of the establishment, each with a plurality of branches. The plurality of trunks allows the systems control computer 206 to allocate channel band width for multiple programming. For example, channel "72" can be allocated for the transmission of a movie "A" on the trunk associated with the second floor of a hotel, while at the same time, a movie "D" may be transmitted on channel "72," on the trunk associated with the third floor of the hotel.

The video distribution network 204, as stated above, is connected to a plurality of room terminals represented by room terminals 208. Generally, in a hospitality facility such as with the system 108, each of the guest rooms will have one room terminal 208 per TV 210. The room terminal 208 interfaces with the systems control computer 206, the video server 202 and other video sources (not shown) controlled by the computer 206, and an in room TV 210. The room terminal 208 is usually a self-contained unit, but can also be a "smart tap" connected to the wall or reside within the TV 210. The room terminal 208 can have two or more external buttons or a full keypad (not shown) for use by the customer in selecting programming and changing television channels. Alternatively, the room terminal 208 may have no external keys, in which case the customer uses a remote control 212 and/or alternative channel changer arrangements (not shown) of the TV 210 to perform the aforementioned functions. The room terminal 208 is utilized to control reception of the broadcast television and special pay-per-view and video-on-demand programming. The room terminal 208 also controls use of interactive video services by providing a user interface to the systems control computer 206 and various system applications.

There are several methods by which the room terminal 208 can transmit data to the systems control computer 206. Some room terminals transmit video data directly to the computer 206 immediately upon receipt thereof. Other room terminals temporarily store the data and transmit only after being polled by the computer 206.

The TV 210 and remote control unit 212 are preferably standard units. Some TVs which are currently available include the functionality of the room terminal 208, such that a separate unit is not needed. In addition, some TVs use unique protocols to communicate with the associated room terminals. Moreover, as will be shown and described with reference to FIG. 5, the room terminal 208 and/or the TV 210 may be connected to magnetic card reading devices that are capable of reading and transmitting credit and debit card information to the systems control computer 206 for validation.

In operation (FIG. 2), data is received by the downlink facility 108a and transmitted to the IRDs 200. The IRDs 200 decode and decompress all "real-time" pay-per-view programming, i.e., programming to be immediately broadcast to customers at prescheduled times, and directly transmit such programming in an RF format to the video distribution network 204. It is anticipated that in a another embodiment, "real-time data" actually may be transmitted and received several times faster than real-time necessary for viewing. The customer uses the remote -control 212 to change the TV 210 (or the room terminal 208) to an appropriate channel to receive the pay-per-view programming. If the customer chooses the programming, the room terminal 208 notifies the systems control computer 206, and a billing record is established. Alternatively, the systems control computer 206 monitors the room terminal 208, records that the customer has chosen pay-per-view programming, and establishes a billing record.

Figure 3:
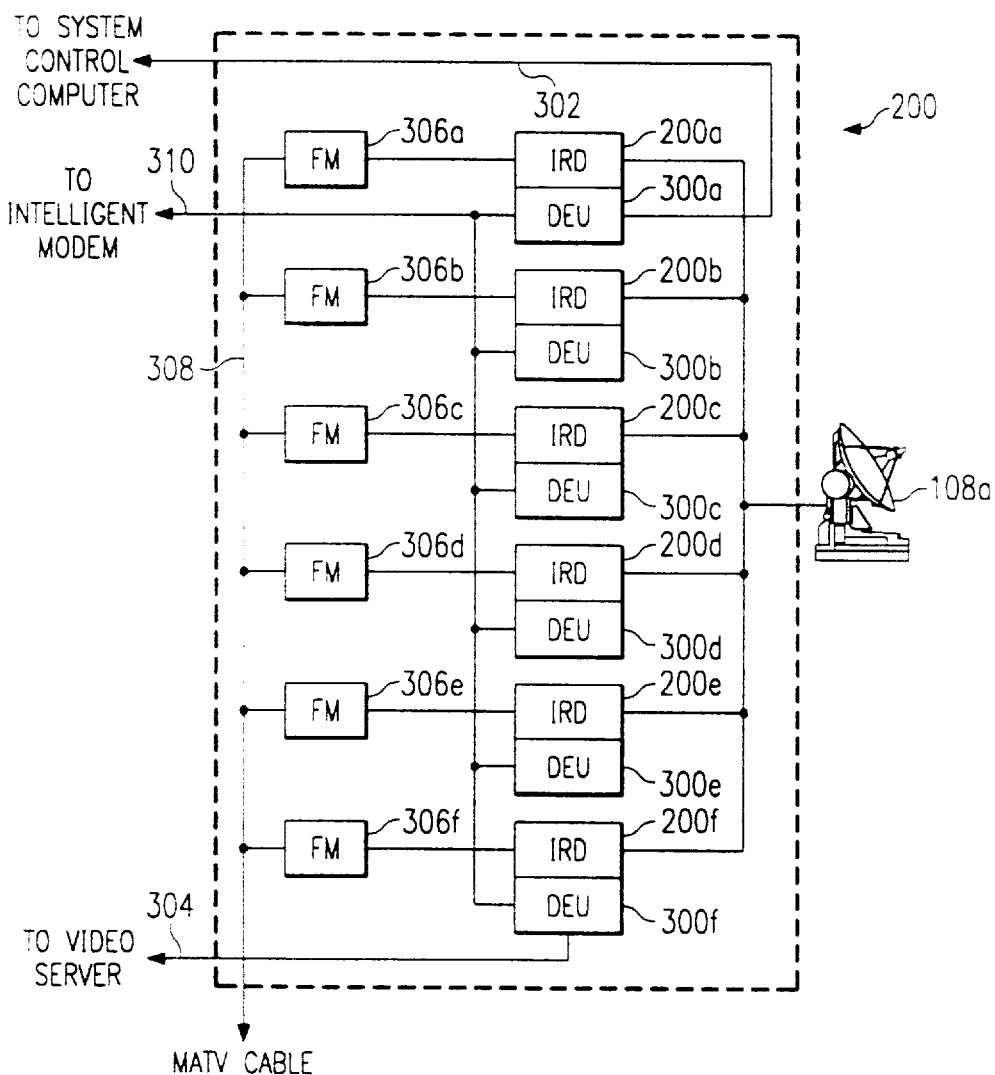
FIG. 3 is a detailed block diagram of several integrated receiver decoders of the video services system of FIG. 2.
Figure 4:
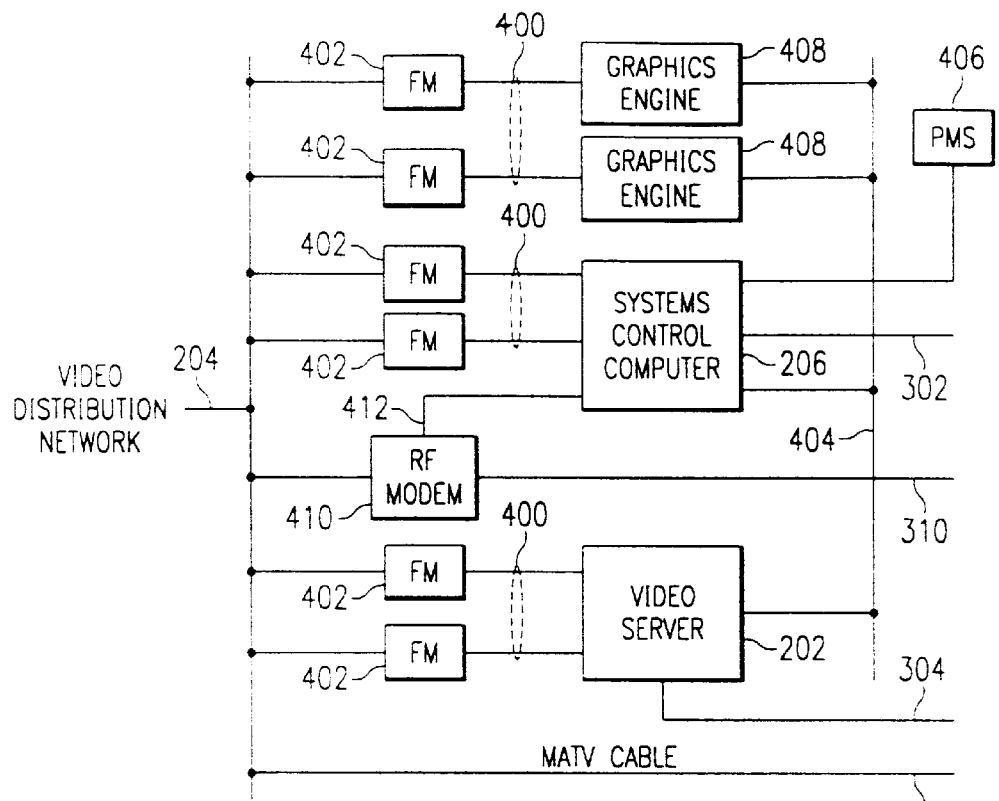
FIG. 4 is a detailed block diagram of the video server and the systems control computer of the video services system of FIG. 2.

FIGS. 3 and 4 are detailed functional block diagrams of select portions of the system 108 of FIG. 2. In FIG. 3, the details of the circuitry of the IRDs 200 is shown. The downlink facility 108a receives encoded data signals from the satellite 106 (FIG. 1) and transmits the received data signals to individual IRD circuits 200a–200f at a bit rate of 3.3 or 6.6 megabits per second (Mbps). It should be understood that the data signals will typically have been previously multiplexed utilizing a known frequency multiplexing format. In addition, it is common that the data is transmitted in packets of information. In one embodiment, the IRDs 200 can be the type manufactured by and commercially available from Compression Lab, Inc. Although not shown, it should be understood that each IRD 200a–200f includes a satellite quadrature phase shifting keying (QPSK) demodulator and a video/audio decoder (not shown). Each IRD 200a–200f is programmed to decode signals within a preselected frequency range. Generally, the video services system 108 (FIG. 1) would have one IRD 200a–200f for each item of "real-time" pay-per-view programming transmitted by the satellite 106; that is, if the system commonly receives eight separate pay-per-view programs, it will have eight IRDs. Any number are contemplated.

In addition, each IRD 200a–200f includes a data expansion unit (DEU) 300a–300f. The DEUs 300a–300f are modules added to the IRDs 200 and provide ports for an RS-232 serial connection and an RS-449 connection for data transfer to the video server 202. The DEUs 300a–300f enable the IRDs 200 to transmit digital data directly to the systems control computer 206 via an RS-232 serial port and transmission line 302. The DEUs 300a–300f also enable the IRDs 200a–200f to transmit digital data directly to the video server 202 via an RS-449 port and a transmission line 304.

Each IRD 200 is connected to a frequency modulator 306a–306f, to which it outputs standard NTSC audio/video signals. Each frequency modulator 306a–306f converts the NTSC audio/video signals received from the IRDs 200 to an RF format. The frequency modulators 306a–306f modulate the signals to an appropriate television carrier frequency for tuning reception by the room terminal 208 or TV 210. The modulated signals are then transmitted via a transmission line 308 to the video distribution network 204 (FIG. 2). In addition, all of the IRDs 200 are connected, via the associated DEUs 300a–300f and a transmission line 310, to an intelligent RF modem (FIG. 4). As will be described, the intelligent modem monitors the IRDs 200 to determine service status and to issue channel change commands.

In addition, the IRDs 200 are capable of differentiating between data within a given packet of information. For example, when video programming is encoded, some packets contain data for an entire screen, or portion of a screen, and other packets only contain data representing changes that occur to the given screen. The second type of packet often does not contain enough data to be a complete packet. Accordingly, data for other video programs can be added to the packet. With this invention, encoded data for the video-on-demand programming, which will be stored in the video server 202 (FIG. 2), are added to packets for the "real time" pay-per-view programs. This data is separated by the IRDs 200 and transmitted, still in its encoded format, to the video server 202.

FIG. 4 illustrates details of the remainder of the circuit of FIG. 2, it being understood the lines 302, 304, 308 and 310 of the left portion of FIG. 3 continue in FIG. 4 in the right portion thereof, as shown. The IRDs 200 (FIG. 3) are connected to the video server 202 via the transmission lines 304. The video server 202 is primarily used to store encoded, digitized video programming for video-on-demand services. Although not shown, it should be understood that the video server 202 comprises a plurality of video disk drives in a video disk drive array, a video disk array controller, MPEG decoder circuit boards, and two processors, including a store-and-forward processor and a server processor. The video disk drives allow only read-only access by customers. The details of these components are also described in FIG. 6 and otherwise will not be described further, since they are readily understandable by those skilled in the art in light of the present disclosure.

During operation, the store-and-forward processor of the video server 202 receives the downloaded video programming data files from the IRDs 200 and the DEUs 300a–300f via transmission line 304. The store-and-forward processor reconstructs the video programming data files and insures file integrity. Once rebuilt, the files for the video program are forwarded to the server processor of the video server 202. The server processor transmits the data files to the video disk drive array. The store-and-forward processor also interfaces, via selected protocols, with the systems control computer 206. When the store-and-forward processor receives a command to transmit a movie, a command is issued to the server processor. The server processor commands the disk array to download data files to the MPEG decoder circuit board.

Once decoded, the signals are transmitted from the server 202 to the video distribution network 204 via a plurality of analog video links 400. Frequency modulators 402 are utilized to modulate the signals to an appropriate television carrier frequency for tuning reception by the room terminal 208 or TV 210. In the preferred embodiment, the video server 202 is capable of switching any given programming to be output on any decoder channel. Alternatively, a video distribution switch (not shown) can be added to the system 108 between the video server 202 and the frequency modulators 402. Such a switch would function as a crosspoint switch and would allow the systems control computer 206 to allocate use of the links 400.

Figure 6:
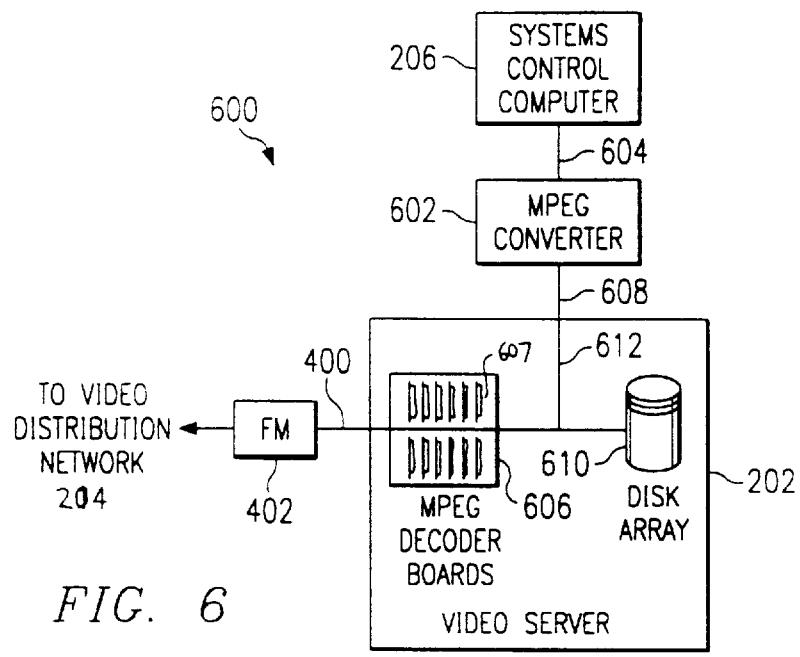
FIG. 6 is a block diagram of the video services system of FIG. 2 altered to include an MPEG converter and decoder circuit boards.

In accordance with a feature of the present invention, the video server 202, under the command of the systems control computer 206, operates so that more than one customer can simultaneously view the same video program (stored in the server 202) and can even begin viewing the selected video program at different times. The read-only files that are stored on the video disk array (FIG. 6) of the server 202 can support multiple accesses. Based on a customer command input using the remote control 212 (FIG. 1), for example, the server processor directs the data corresponding to the selected video program to a separate MPEG decoder circuit board (FIG. 6). The video data is decoded and transmitted to the designated room terminal 208 and TV 210 via a separate link 400.

In the preferred embodiment, the video server 202 is a modular configuration, with an initial module (of disk arrays) capable of storing twenty (20) to thirty (30) programs, such as movies, depending on the length of the program, that are simultaneously accessible by thirty-two (32) customers via their in-room terminals 208 and associated TVs 210. Additional modules would enable this video server 202 to store as many as 900 full length movies that are simultaneously accessible to hundreds of viewers. However, for the hospitality market, it may not be necessary for the video server 202 ever to store a library of more than fifty (50) to one hundred (100) full length video programs. Because of its architecture, the video server 202 constantly can be updated with popular programming, while less popular programming is erased. All programs are available to all room terminals 208 and TVs 210 connected to the system 108 at any time.

The video server 202 receives commands from the systems control computer 206, which instructs the server 202 regarding which programming to play, when to play the programming and which room terminals 208 are to receive the programming. The video server 202 determines the transmission channel and channel selection back to the systems control computer 206 via an Ethernet LAN 404. The system 108 can be configured so that only one customer or multiple customers can access a particular video-on-demand program stored in the server 202 at a given time.

The video server 202 decodes video data comprising a selected movie using MPEG standards and transmits the decoded data utilizing radio frequencies. The video server 202 also can store the video programming data for scheduled pay-per-view programming. At a scheduled time, the systems control computer 206 commands the video server 202 to transmit the selected program on a channel that can be accessed by all the hospitality establishment's customers. The systems control computer 206 monitors the room terminals 208 in order to determine which customers access the programming and should be billed for the services.

The video server 202 is connected to the systems control computer 206 via the Ethernet LAN 404. The systems control computer 206 provides logic support for the video server 202 and comprises a processor for data processing capability, hard drive storage for storing control and program algorithms, and read only memory (ROM) and random access memory (RAM) (not shown). In one embodiment, the systems control computer 206 is a personal computer that utilizes an Intel 486 DX processor, 33 MHz with a 210 megabyte IOE hard disk and the SCO Lite UNIX Operating System, although it should be understood that a variety of other computer configurations can be utilized. In addition, the systems control computer 206 will include custom applications software, sound boards and multichannel graphics circuit boards (not shown). The computer 206 is capable of generating graphics screens, as well as video and/or audio prompts, to interact with customers.

The systems control computer 206 is connected to the room terminals 208 (FIG. 2), via the video distribution network 204. The computer 206 receives information from the room terminals 208, and utilizes the received information to provide video and other services for the customer. The systems control computer 206 is also connected, preferably via RS-232 serial links, to the hospitality establishment's property management system (PMS) 406, a printer (not shown), a front desk terminal (not shown). These connections allow the systems control computer 206 to integrate the video services system 108 with the hospitality establishment's billing system to provide a variety of customer and billing services. In addition, the computer 206 contains a 9600 baud modem (not shown). The modem enables remote access by the management company in order to download records and perform remote diagnosis of all system computers and allows the computer 206 to access remote data bases and services.

The systems control computer 206 is connected to the video server 202 and to graphics engines 408 via the Ethernet LAN 404. LAN operating software resides within the computer 206. The systems control computer 206 communicates with the video server 202 according to a suitable protocol. The computer 206 receives commands for video-on-demand programming from the room terminal 208 and send commands to the video server 202 to cause the server 202 to broadcast, or "play" the selected program. In addition, the computer 206 monitors the video server 202 to determine which programs are available and which programs are being watched. The computer 206 performs diagnostics and status tests on all channels in the video server 202 system. Likewise, the video server 202 can store the data for pay-per-view programming, in which case, the systems control computer 206 must include scheduling instructions and a timing means such that at prescheduled times, the systems control computer 206 can transmit a command to the video server 202 regarding which programming to play and which room terminal 208 is to receive the programming.

The graphics engines 408 are utilized to distribute selected audio, video and graphics applications from the computer 206 to remote processors. The graphics engines 408 comprise a processor (motherboard), graphics card, Ethernet card, and audio sound card (not shown). A disk operating system and Windows applications for the graphics engines 408 reside in the systems control computer 206. The graphics engines 408 are utilized for generating audio/visual prompts, barker screens, and other advertisements and similar applications, which the systems control computer 206 can cause to be displayed on the TV 210 in place of broadcast advertising. The systems control computer 206 also can be connected, via the Ethernet LAN 404, to CD ROM units (not shown).

The systems control computer 206 is connected to an intelligent RF modem 410 via an RS 232 serial link 412. Alternatively, the modem 410 may be internal to the computer 206. The RF modem 410 is utilized to convert computer communications signals to the room terminals 208 from a digital format to RF signals. In the preferred embodiment, the modem 410 includes its own limited processing capability. Therefore, instead of utilizing the processing capability of the computer 206 to initiate communications to the room terminals 208 or the IRDs 200, the intelligent RF modem 410 may poll, communicate, and receive data at its own initiative and connects the appropriate terminals to the computer 206 only for status changes. As described above, the RF modem 410 provides a command and status interface with the IRDs 200.

The systems control computer 206 is directly connected to the IRDs 200 via the RS 232 serial link 302. Data for scheduling and billing, as well as audio/video data for advertisements, can be transmitted to the hospitality establishment via the satellite 106 (FIG. 1) or through another communications network. This data can be differentiated from other video data by the IRDs 200 and transmitted directly to the systems control computer 206 via link 302. If the data for advertisements is in the MPEG format, it will be transmitted directly to the video server 202 via link 304.

As previously indicated, the systems control computer 206 and the graphics engines 408 are connected to the video distribution network 204 by a plurality of links 400. Each link 400 is connected to a frequency modulator 402. The frequency modulator 402 is utilized to modulate the signals to an appropriate television carrier frequency for tuning reception by the room terminal 208 or TV 210. Alternatively, a video distribution switch (not shown) may be added to the system between the systems control computer 206/graphic engines 408 and the frequency modulators 402. As described previously, this switch would function as a crosspoint switch and would allow the systems control computer 206 to allocate the use of the channels.

Figure 5:
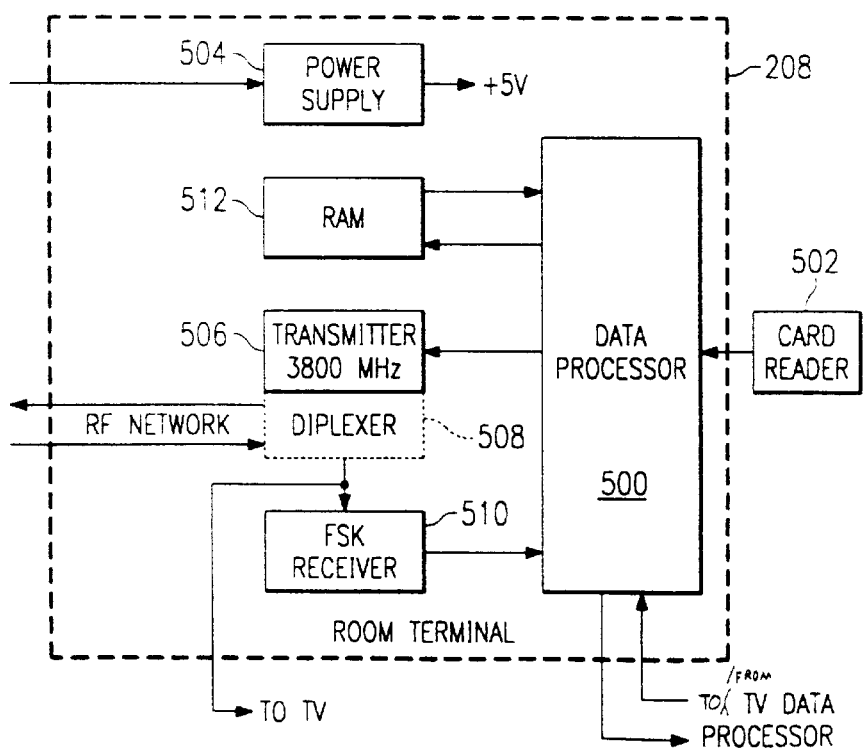
FIG. 5 is a functional block diagram of a room terminal of the video services system of FIG. 2.

FIG. 5 illustrates details of the room terminal 208. Referring to both FIGS. 1 and 5, in an exemplary operation, a customer responds to a menu displayed on the TV 210 that lists programming stored in the video server 202 by using the remote control unit 212 to select items from the menu. Infrared signals generated by the remote control unit 212 are transmitted to the TV 210, which transmits the signals to a data processor 500 of the room terminal 208. These signals, along with the unique address of the room terminal 208, are transmitted to the systems control computer 206. Referring again to FIG. 4, the systems control computer 206 processes the request and issues commands to the video server 202 via the Ethernet LAN 404. The systems control computer 206 also transmits audio/video or graphic instructions to the TV 210 instructing the customer to tune the TV 210 to a specific channel frequency bandwidth, such as that represented by "channel 15," to receive the programming. Alternatively, the room terminal 208 can tune the channel for the customer. The systems control computer 206 processes billing information entered by the customer, if such billing information is entered using a card reader 502 or the remote control unit 212, or adds the charge for the service to the room bill by accessing the establishment's property management system 406 via an RS 232 serial link. In addition, the systems control computer 206 transmits commands to the video server 202 and frequency modulators 402 designating a channel for transmitting the selected program.

Upon receipt of a particular command from the systems control computer 206, the video server 202 begins downloading the selected programming from the appropriate disk drives (not shown) to a buffer (not shown) within the decoder circuit boards (FIG. 6). In the preferred embodiment, the decoder circuit boards (FIG. 6) are internal to the video server 202; but they can comprise a separate unit. In addition, the decoder circuit boards (FIG. 6) convert the data from MPEG format to NTSC format. Finally, the data is converted from digital signals to RF signals. These RF signals are then transmitted from the video server 202 to the frequency modulators 402, which modulate the signals to the appropriate frequency channel.

As previously stated, the system as described herein allows customers to interact with the programs stored in the video server 202. For example, customers can use the remote control unit 212 to implement a "bookmark" application. This application allows customers to stop the transmission of a selected video program and begin watching the program from the exact same point at a later time, until the program is erased from the video server 202 by the reception of new programming via the system 100. However, time limit parameters for the "bookmark" application can be programmed into the systems control computer 206; for example, bookmarks could be erased after 24 hours. Likewise, when a customer checks out of the hospitality establishment, the systems control computer 206 is notified of the status change by the PMS 406. In response to the notification, the systems control computer 206 could command the video server 202 to erase that customer's bookmark.

Accordingly, this application represents an advancement in the art over video server systems that only allow a customer to "pause" the program for short periods of time. The room terminal 208 transmits the signal for the bookmark application via the video distribution network 204 to the systems control computer 206. The systems control computer 206 receives the command and stores the room number, billing information, channel information, and other vital information in its memory. The computer 206 also transmits commands, via the LAN 202, to the video server 202 to cease transmission of the program and to mark in its memory the stopping place. The customer can reactivate transmission of the programming with the remotecontrol unit 212. The room terminal 208 transmits the command to the systems control computer 206 via the video distribution network 204. The systems control computer 206 receives the transmission and forwards the appropriate data to the video server 202 via the LAN 404 to reactivate transmission of the program from the location of the bookmark. As another example, the system 100 as described herein is capable of receiving advertisements from the uplink facility 102 and satellite 106 (FIG. 1) and storing them either in the systems control computer 206 or the video server 202.

The advertising data is forwarded to the appropriate storage facility by the IRDs 200 and DEUs 300a–300f based on the format of the encoded signals. In addition, data for time schedules for transmitting the advertisement to the room TVs 210 and channel information, as well as header information identifying the advertisement, are transmitted with the advertisement. Typically, such advertisements are shown at scheduled times. For example, a cable news station chooses to let the hospitality establishment or system 100 service provider show its own advertisements instead of the regular broadcast advertisements. At the scheduled time, the systems control computer 206 begins to transmit one of the advertisements over links 400. The transmitted advertisement is modulated to the appropriate channel by frequency modulator 402. If the advertisement is stored within a memory of the video server 202, the systems control computer 206 transmits appropriate signals to the video server 202 via the Ethernet LAN 404, identifying the advertisement to be transmitted, the transmission channel over which it is to be transmitted, and other information. The advertisement is transmitted via links 400 to the frequency modulator 402 where it is modulated to the appropriate frequency. In this manner, the customer receives the advertisement transmitted by the systems control computer 206 rather than the one transmitted by the cable television station. Alternatively, instead of scheduled advertisements, some television and cable stations precede their advertisements with a transmitted queue tone. The systems control computer 206 monitors the programming for a queue and upon detecting the tone, the appropriate advertisement is transmitted as described above.

Not only does the system 108 provide the flexibility for the systems control computer 206 to instruct the video server 202 to preempt cable and broadcast television commercials by inserting commercials for pay-per-view and video-on-demand services, the systems control computer 206 can selectively insert commercials based on the viewing habits of each particular customer. The systems control computer 206 retains records of the video-on-demand services and pay-per-view programming viewed or purchased by each customer for billing and other purposes. The systems control computer 206 utilizes this database to determine which programming the customer has already viewed. The systems control computer 206 can delete advertisements for those programs from the commercial transmission schedule algorithm for that customer. Likewise, an algorithm can be used by the systems control computer 206 to select and transmit commercials based on the customer's interests. For example, if the customer has viewed several adventure programs, the systems control computer 206 will determine that the customer prefers adventure programs and command that a larger proportion of advertisements transmitted to that customer are directed toward adventure programs. These advertisements controlled by the systems control computer 206 can reside in hard disk memory of the systems control computer, in the hard disk array of the video server 202 or in a graphics engine 408.

Similarly, cable or network program codes (the identification code for each broadcast program), as well as program schedules, can be input into the systems control computer 206 via the 9600 baud modem (not shown) or the satellite or other communications network link via the IRDs 200 and DEUs 300a–300f. For example, the identification code for the movie "Beauty and the Beast" is "83502." As the systems control computer 206 monitors and polls the plurality of room terminals 208, it determines the channel that a customer is accessing with the TV 210. An algorithm compares that channel with the time of day, the schedule, and the program identification codes. The systems control computer 206 then determines and records in an internal data base the programming viewed by the customer as determined by the customer's room terminal 208. The systems control computer 206 can use the internal data base information to determine what type of programming the customer prefers and then transmit advertisements for similar programming to the customer. For example, if the customer views the movie "Beauty and the Beast" on a cable television channel, the computer 206 commands that a larger proportion of advertisements for the children's programming stored in the video server 202 is transmitted to the room terminal 208 and displayed on the TV 210.

In FIG. 5 the room terminal 208 is equipped with with the optional card reader 502. It should be understood that various functions and circuits of the room terminal 208 not directly related to the invention as disclosed herein are not shown or described herein. As previously indicated, many TVs now have internal data processors and infrared receivers and incorporate much of the same capability as room terminals manufactured as recently as five years ago. Because of the increased capability of the TV 210 and duplicated functionality, it has become common in the art for a video services system to utilize room terminals with decreased functionality, but including a data processor, such as the data processor 500, that is capable of interacting, via protocols, with the processor of a TV 210.

Data processor 500 is connected to a processor (not shown) of the TV 210 via an RJ 11-type interface (not shown). Four of the six wires of the RJ-11 interface, respectively, carry data from the processor 500 to the TV 210 processor, data from the TV 210 processor to the processor 500, infrared data from an infrared receiver (not shown) of the TV 210 to the processor 500, and clock information from the TV 210 to the processor 500.

The room terminal 208 includes a power supply 504, which outputs +5 volts for use by the circuits of the room terminal 208. Because of the low power requirements of the room terminal 208, it can receive power from a wall plug or from the TV 210. A transmitter 506 is utilized by the room terminal to transmit signals to the systems control computer 206. When the transmitter 506 receives data and the appropriate signal from a data processor 500, the resulting signal is output to the systems control computer 206 by means of a diplexer 508.

The diplexer 508 provides capability both to transmit and receive signals over the RF carrier network 204. Cable or broadcast television signals pass through the diplexer 508 directly to the TV 210. Commands or other signals from the systems control computer 206 are directed by the diplexer 508 to a frequency shift key (FSK) receiver 510 and then to the data processor 500.

The data processor 500 receives inputs from and controls almost all circuits comprising the room terminal 208. Each room terminal 208 in the hospitality establishment has a unique identification number, or address, that is stored in the processor 500. The processor 500 must at least have adequate processing capability to process billing data received from the optional card reader 502 and commands received from the TV 210, including commands input by the customer with the remote control unit 212. Characteristically, this data is temporarily stored in a non-volatile random access memory (RAM) 512. Data is read from the RAM 512 and transmitted to the transmitter 506 when requested by the systems control computer 206 (i.e., when the room terminal 208 is polled by the computer 206). Alternatively, the data is read from the RAM 512 and transmitted by the transmitter 506 without being polled by the computer 206 if the communications are initiated by the room terminal 208.

As described above, the data processor 500 interacts with the TV's data processor (not shown). Among other functions, the data processor 500 and the systems control computer 206 manipulate the tuning of the TV 210 tuning for reception of video-on-demand programs and to prevent unauthorized access to programming. The systems control computer 206 transmits instructions to customers using audio/video or graphics screens, instructing them to tune to a particular channel frequency bandwidth to view the selected video-on-demand programming. Typically, hospitality video systems reserve a block of channel frequency bandwidth that cannot be tuned by the customer for video-on-demand programs. As previously described, a customer uses the remote control unit 212 to select programming from a menu displayed on the TV 210. Upon receipt of signals from the remote control unit 212, via the TV 210, the room terminal 208 transmits commands to the systems control computer 206 requesting broadcast of the selected video-on-demand program. The systems control computer 206 transmits appropriate commands to the video server 202, including channel frequency bandwidth information. In addition, the systems control computer 206 transmits the commands to the room terminal 208 and the TV 210 instructing that the channel is tuned to the same channel frequency as that being transmitted by the video server 202. The channel frequency actually used is different than the one selected by the customer. In other words, the systems control computer 206 and room terminal 208 cause the selected program to be received at a channel frequency bandwidth different than that selected by the customer.

For example, assuming the customer has tuned the TV 210 to a frequency bandwidth represented by channel "15," the systems control computer 206 and the room terminal 208 will retune the TV 210 to a frequency bandwidth normally inaccessible by the customer (e.g., channel "28") unless a movie or other video-on-demand program is ordered. The customer is unaware of this activity. Other customers that tune to channel "15" will not receive the video-on-demand programming selected by the particular customer. In this manner, and because the process is controlled by the systems control computer 206 and the room terminal 208, unauthorized access to video-on-demand is blocked.

FIG. 6 is a functional block diagram of an alternative hospitality system 600 similar in some respects to the system 108. The system 600 includes an MPEG converter 602. The MPEG converter 602 provides an advancement to the architecture of system 108, as described below. Among other advantages, the MPEG converter 602 enables the system 600 to multiplex data transmitted from the computer 206 and data transmitted from the video server 202 onto a single transmission channel for transmission to the TVs 210.

Because the decoder (FIG. 6) buffer 607 for a given frequency channel is receiving data from two sources, the data are multiplexed onto that given transmission channel. Moreover, the converter 602 enables screen data from the computer 206 and the server 202 to be merged in a manner that a new screen is formed and transmitted to the TVs 210.

It is understood the systems control computer 206 executes the same functionality described above with respect to FIG. 4. The computer 206 is utilized to generate graphics screens and animation, as well as short audio/video programs that have been digitized and stored on a hard disk or in CD ROM format. Alternatively, the computer 206 can utilize graphics engines 408 (FIG. 4) to generate audio, video, and graphics data. However, the ever increasing processing capability of the personal computers utilized to perform the functionality for the systems control computer 206 may reduce the need to use separate graphics engines 408 for generating graphics data. Also, as described in FIG. 4, the systems control computer 206 is connected to an RF modem 410.

In the preferred embodiment, the MPEG converter 602 is installed in a video graphics array (VGA) port of the systems control computer 206. The MPEG converter 602 receives the graphics data via the computer's internal bus 604. The design of the converter 602 enables it to function in conjunction with a multiplicity of computer operating systems, including UNIX OS2, and Windows NT.

The MPEG converter 602 can have MPEG-1 and/or MPEG-2 encoding capability. As background, the Motion Picture Experts Group (MPEG) coding scheme is arranged in data layers in a hierarchical structure. MPEG bitstream consists of header data and some number of groups of encoded frames. The primary layer of the header information is utilized to define the extent of all the video data that is encoded in the subsequently transmitted data frames. This top most header organizes the data frames into what is known in the art as a "group of pictures," and informs decoder boards 606 of the pixel locations that will be affected by the encapsulated data frames. For example, a group of pictures may be defined to encompass the entire graphics screen presented on the TV 210 and consists of several MPEG screen types (e.g., I, P, and B). A subsequent group of pictures of the same screen types may be defined that utilize on the upper quadrant of the screen.

MPEG coding consists of four types of data frames (also referred to as "pictures"): I-frames which are coded without reference to other frames; P-frames which are predictive frames encoded using motion compensation from the previous I-frame; B-frames which are bidirectionally predictive using motion compensation from previous or future I, P or D-frames; and D-frames which are used only for fast-forward functionality. Currently, only the I, P, and B frames are utilized by the MPEG converter 602. However, other applications may utilize D-frame encoding. The MPEG converter 602 utilizes MPEG-1 or MPEG-2 capability for the purposes of transmitting computer generated graphic screens for advertising video-on-demand programming and for services such as "video checkout" on the TV 210. For MPEG-1 encoding, the MPEG converter 602 receives 32 channels of graphics screen data with a resolution of 320 lines by 200 columns and 256 colors from a palette of 224 possible colors. After the encoding process is completed, the MPEG converter 602 outputs to the video server 202 MPEG-1 digital signals, in which the "I-frame" is encoded, over a 16 bit synchronous transmission line 608.

With this embodiment, an advanced-functionality MPEG converter 602 with MPEG-2 capability receives both graphical and digital data input from the systems control computer 206. Typically, it receives thirty-two (32) channels of graphics data, with a resolution of 640 lines by 400 columns and 24 bit true color capability. In addition, this embodiment of the MPEG converter 602 receives from the systems control computer 206 thirty-two (32) channel digital data input, including MPEG-2 encoded I- and P-frame data. Characteristically, the MPEG converter 602 receives digital data via 16-bit or 32-bit synchronous transmission line 604. 5 When receiving data that already is encoded in MPEG-2 format, the MPEG converter 602 functions as a digital multiplexer and is capable of superimposing, or overlaying, the data with video programming that is stored in a disk array 610. The MPEG converter 602 has sufficient resident memory (FIG. 7), specifically, 2 to 64 megabytes of RAM, to save thirty-two (32) screens. The digital signal processor (FIG. 7) for the MPEG converter 602 is, for example, a Texas Instruments TMS 320C40 or TMS 320C44 and has the capability to encode up to thirty two channels of graphics data per second.

The MPEG converter 602 has a bitmap hardware register (FIG. 7) that identifies and tracks the channels that have been modified, by an X-Windows driver (not shown) of the systems control computer 206, to contain graphics or video data. The X-Windows driver is a Unix-based windowing system that provides a program interface for graphic window displays. After the MPEG converter 602 encodes a given channel, the bit register is cleared.

Alternative embodiments of the MPEG converter 602 are possible. The MPEG converter 602 can be a stand-alone unit located between the systems control computer 206 and the video server 202. The MPEG converter 602 receives graphics data via the transmission line 604. In this embodiment, the transmission line 604 could be one of a variety of arrangements sufficient in bandwidth capability to receive graphic primitives from the systems control computer 206. Ideally, the transmission line 604 is the Industry Standard Architecture (ISA) bus internal to the systems control computer 206. Likewise, the MPEG converter 602 is connected to the video server 202 via the transmission line 608. Preferably, the transmission line 608 is a synchronous SCSI-2 bus interface connectable onto the internal SCSI-2 bus of the video server 202. If located more that ten (10) feet from the video server 202, the MPEG converter 602 preferably would be connected via fiber optic cable.

As an additional embodiment alternative, the MPEG converter 602 can be hardware installed within the video server 202. The MPEG converter 602 would be connected to an internal bus 612 of the video server 202 and still would be connected to the internal ISA bus (not shown) of the systems control computer 206 that is extended to the MPEG converter 602 via transmission line 604. As with the above described embodiments, this embodiment could be advantageous when a video server 202 is being accessed off-premises from a centralized location for numerous hospitality establishments or for a non-hospitality application (e.g., residential customers) and is receiving data from one or more computers 206. The computers 206 could reside in locations remote from the video server 202 and each computer 206 could be operated by different service providers. This implementation would be especially advantageous in an architecture where the video server 202 is part of a common carrier's video dial tone network. Various service providers, each with a computer 206, could have tariffed access to the network to broadcast advertising and service offerings with graphic screens and audio/video. This data would be received, encoded, and multiplexed onto the common carrier's network by the MPEG converter 602 in the same manner as described herein.

Finally, MPEG converter 602 functionality could be incorporated into the operations software of the systems control computer 206. The X-Windows driver for the systems control computer 206 would be modified to write image data to memory buffers allocated from the computer's RAM. An "encode and send" primitive is used which commands the driver to perform an MPEG I-frame encode on the selected screens in the memory buffer, and write the encoded buffer to a standard transmission interface (e.g., SCSI-2). The systems control computer 206 also requires a special device driver and an SCSI controller. In order to execute this functionality, the systems control computer 206 requires a 66–100 MHz Pentium processor (Intel 80586 microprocessor) and additional 128 megabytes of RAM memory.

Graphics engines 408 (FIG. 4) also can be modified to utilize the MPEG converter 602. When a graphics engine 408 is selected by the systems control computer 206 to generate a graphics screen, the engine 408 arbitrates for local bus access to the computer 206 and writes data to the assigned channel on the MPEG converter 602 using as serial telecommunications bus (STB) standard channel driver (not shown).

The MPEG converter 602 and the disk array 610 are connected via internal bus 612 to the MPEG decoder boards 606. In the preferred embodiment, internal bus 612 is a SCSI-2 bus. The SCSI bus 612 is particularly suited to this architecture both because its data transmission capacity of ten (10) megabytes per second allows for rapid transmission of the data screens and its transmission capability can be driven by multiple master devices. With this architecture, both the systems control computer 206 and the video server's processor unit (not shown) function as a master driver for the SCSI bus 612 by controlling the transmission of data from the MPEG converter 602 and the disk array 610 to the decoder boards 606. The functions of both the disk array 610 and the MPEG decoder boards 606 are described with reference to but not shown in FIG. 4. Screen data encoded by the MPEG converter 602 is transmitted, stored, and displayed from screen buffers 607 internal to the decoder boards 606. The buffers 607 contain enough memory to build several screens of 352×240 resolution. The MPEG data received into the buffers 607 is decoded from MPEG format and then encoded into NTSC, PAL, or SECAM formats. Once all the screen information is present in the particular buffer 607 and is encoded, the information is transmitted to connected TVs for viewing. Because the buffer 607 for a given frequency channel is receiving data from two sources, the data are multiplexed onto that channel for transmission via the network 204 to the TVs 210. The screen continues to be displayed until it is overwritten completely or partially by new data transmitted to the same decoder board 606. Any portion of a screen generated by the systems control computer 206 will continue to be displayed from the decoder board's screen buffer 607 if the subsequent MPEG data displayed on the same channel contained in the group of pictures defined to encompass less than an entire screen. In this manner, full motion video and sound can be overlaid over computer generated graphics. Transmission line 400 and frequency modulator 402 are described in FIG. 4

In an exemplary illustration, a computer generated graphic screen used to advertise a video program (e.g., the movie Jurassic Park). Typically, the graphic screen data is stored on the hard disk of the systems control computer 206.

As will be further described with reference to FIG. 7, the data for the screen is mapped onto the internal RAM memory of the MPEG converter 602 and encoded by its processor, as described in FIG. 7.

Once the encoding process is completed, the header and screen information are copied to an MPEG decoder board 606, via SCSI bus 608 and 612. The header data provides the decoder board 606 with information concerning the organization of the data frames being transmitted and the location of the encoded pixels. Important to this example, the header information also informs the decoder board 606 that the data frame is not a complete screen and will only encompass a given quadrant of the screen. The encoded data for the screen is captured by the decoder's buffer 607. The decoder board 606 then decodes the data into RF signals and transmits it to a frequency modulator 402 via link 400. The data from the encoded screen remains in the decoder's internal buffer 607 until it is overwritten all or in part by data from a subsequent transfer. In this illustration, the graphic screen transmitted from the MPEG converter 602 contains only text and thus is not a complete screen. The graphic screen is transmitted on the same channel and to the same decoder 606 that previously is being utilized by the video server to display a short audio/video section, of a given movie (Jurassic Park), that is stored on the disk array 610. The data from the disk array 610 transmission remains in the decoder buffer 607, with only a portion of it replaced when the decoder 606 receives the graphic information from the MPEG converter 602. The decoder buffer 607 then transmits the superimposed image to the room terminal 208 and TV 210.

In a like manner, the MPEG converter 602 is capable of providing subtitles for the entertainment programming stored in the disk array 610. Special menu screens are provided for customers offering the optional use of subtitles. For example, customers can be given the choices such as, "Press 1 for subtitles; Press 0 to view the movie now." If the customers press the "1" key on the remote control 212 (FIG. 2) keypad or the room terminal 208 keypad, they receive additional choices such as, "Press 1 for French, Press 2 for Spanish, Press 3 for English." The customers' responses are transmitted upstream to the systems control computer 206. once the response is received, the computer 206 activates the appropriate file containing the data for the subtitles as well as timing and synchronization algorithms. The graphics data for the subtitles is then processed and superimposed over the audio/video programming (e.g., Jurassic Park) being copied from the disk array 610 to the decoders 606 using the process as described above and in FIG. 7.

Figure 7:
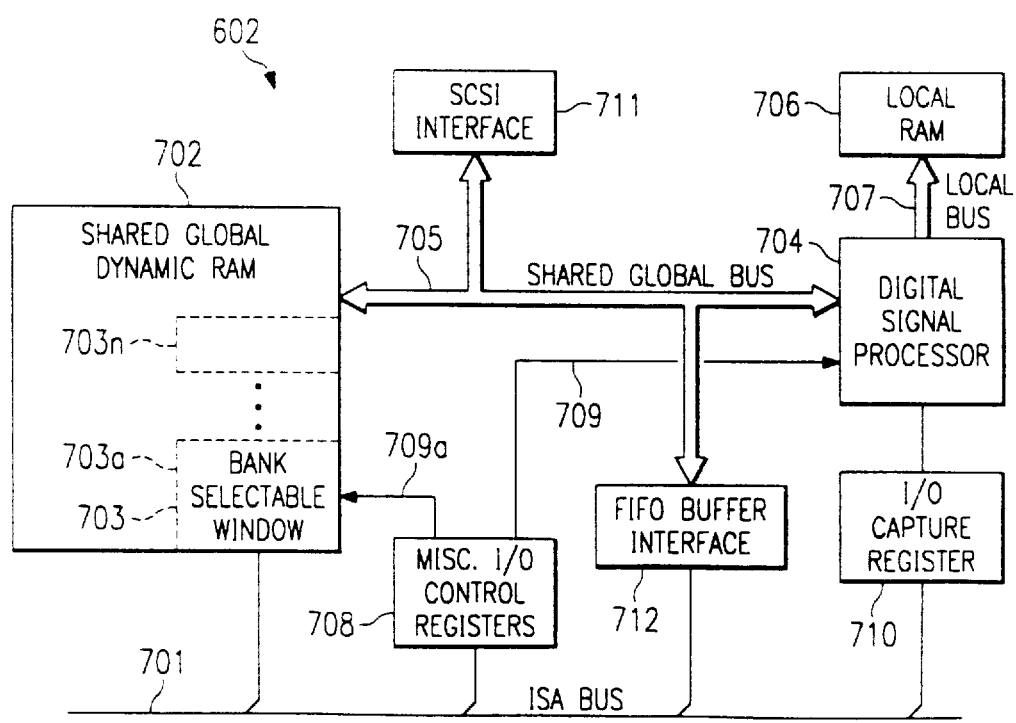
FIG. 7 is a detailed block diagram of the MPEG converter of FIG. 6.

FIG. 7 is a functional block diagram showing details of the MPEG converter 602. In this illustration, the MPEG converter 602 is internal to the systems control computer 206 and is connected to that computer via an Industry Standard Architecture (ISA) bus 701. The ISA bus 701 is a commonly used bus architecture on the motherboard of computers with MS-DOS and UNIX disk operating systems. The ISA bus 701 can support 8- and 16-bit data transfers. Likewise, the MPEG converter 602 can be adapted to function with a 32-bit bus such as the Extended Industry Standard Architecture (EISA) bus. As described above, the MPEG converter 602 can reside exterior to the computer 206.

The systems control computer 206 writes graphics data for a given graphics screen to a shared global dynamic RAM 702 via the ISA bus 701. Data is written to the dynamic RAM 702 in a manner emulating data written by a computer to a VGA display adapter. In this manner, the MPEG converter 602 is able to emulate most existing VGA display adapters currently available in the marketplace by receiving and processing data formatted for those VGA circuit boards. However, unlike VGA display adapters, the dynamic RAM 702 of the MPEG converter 602 contains two to four megabytes of memory and contains a bank of as many as thirty-two windows for receiving and storing graphics screen data. The foregong are represented in FIG. 7 as bank selectable windows 703a–703n. The unique window configuration allows the computer 206 to plot simultaneously multiple graphics screens in the RAM 702 memory, each to be transmitted on a specific channel. The window configuration also allows the MPEG converter 602 to multiplex screens onto a given transmission channel with the video screens from the video server 202. In this manner, the RAM 702 can fulfill functions similar to a digital switch with the graphic being transmitted over the channel to the appropriate TV 210.

Each window 703a–n is a contiguous block of 64 or 128 kilobytes of data. However, the RAM 702 can be expanded to 64 megabytes total of memory, enabling bank selectable windows 703a–n with increased memory capability and/or an increased number of windows. As presently configured, the RAM 702 can receive data either at eight (8) or sixteen (16) or thirty-two (32) bit wide data quantities.

The MPEG converter 602 also contains a digital signal processor 704. The processor 704 is utilized to execute the algorithms and computations necessary to simultaneously encode multiple channels of video graphic data into MPEG-1 or MPEG-2 images. The preferred processor to execute this functionality of the processor 704 is a Texas Instruments TMS320C44. Other processors could be used. However, to execute the required functionality, the processor should have the capability of executing approximately ten times as many instructions per second as an INTEL 486; 33 MHz processor. The digital signal processor 704 and the shared global dynamic ram 702 are connected via a shared global bus 705. The digital signal processor 704 utilizes local RAM memory 706 to provide fast access memory to store working program data. The local RAM 706 provides 512 kilobytes of 0-wait state static RAM. The digital signal processor 704 is connected to the local RAM 706 via local bus 707.

Among other functions, the digital signal processor 704 is utilized to encode graphics data, or other data generated by the systems control computer 206, into MPEG-1 or MPEG-2 standard encoded data. For graphics screens that generally are held static on the viewer's television set for several seconds, the digital signal processor 704 normally will encode the signals into the MPEG-1 format and will only be encoding I-frames. B- and P-frames are "predictive" frames that represent changes to the I-frames. With static graphic screens, B and P frames usually are unnecessary. For other applications, the MPEG converter 602 will encode I-, B-, and P-frames utilizing the MPEG-2 format. Typically, the graphic image first will undergo a color-space conversion to a coded frame broken into luminance (Y) and two chrominance components (Cb and Cr). Because natural images are not noticeably affected when the chroma components of the image are reduced, both the Cb and the Cr chrominance components are reduced by a factor of two. Next, the luminance and the chrominance elements are grouped into macro-blocks of 8×8 pixels. A spacial frequency transform (referred to in the art as a discrete cosine transform or DCT) is applied to the macro-blocks to obtain better organization of the data. In addition, the high frequency components of the transform are discarded. Next, the resulting horizontal and vertical spacial frequency coefficients are mapped in a fashion known in the art as a "zig-zag" scan, by ordering AC (non-zero) coefficients from the lowest spacial frequency to the highest. Coefficients of the vector are then uniformly scalar quantized, run length coded, and finally, the run-length symbols are variable length coded using a "modified-Hoffman" scheme. Global redundancy is reduced, followed by quantization and variable length entropy coding of the data. The digital signal processor 704 is capable of utilizing a variety of error correcting techniques, known in the art, in order to correct sampling errors and limit image degradation during the conversion process.

Typically the MPEG converter 602 is required to encode graphics screens made up of 320 columns by 200 lines by 256 colors. To handle screens of higher resolution or more colors, the digital signal processor 704 simulates the extended register handshake of an appropriate graphics adapter in order to map in different parts of a complete screen. When a new screen is started, the digital signal processor 704 sets an internal timer (not shown) whose maturation will schedule an MPEG conversion of the targeted screen. An "interrupt" signal resulting from systems control computer's 13 requesting a different screen will force the maturation of the timer and results in the immediate scheduling of the previously selected screen for MPEG conversion.

Miscellaneous input/output (I/O) registers 708 are a bank of special function hardware registers that control the operation of the MPEG converter 602. The miscellaneous I/O registers 708 are used for general purpose read-write functions; ISA bus 701 and digital signal processor 704 read-write functions and digital signal processor 704 interrupt functions. The miscellaneous I/O registers 708 execute these functions via connections to the ISA bus 701 and to the dynamic RAM 702 and digital signal processor 704 via lines 709a and 709b.

In addition, the miscellaneous I/O registers 708 are utilized to set the address default range for the MPEG converter's ISA bus 701 monitoring capability. When the addresses for a read or write on the ISA bus 701 fall within the default range, the I/O control registers 708 trigger the operation of the I/O capture register 710. Typically, the default values utilized by the registers 708 are the standard VGA I/O addresses. However, the miscellaneous I/O control registers 708 are programmable and can encompass enlarged, or different, default ranges. Accordingly, the I/O control registers can be programmed to allow the MPEG converter 602 to emulate most VGA circuit boards currently available in the marketplace. Default values are loaded into the miscellaneous I/O control registers 708 at system initialization.

An I/O capture register 710 is composed of a group of hardware latches and is utilized to seize the contents and source of the address data. Likewise, the I/O capture registers 710 capture the contents of the data bus (ISA Bus 701) data during the ISA bus 701 1/0 operations that meet the selection criteria as defined by the miscellaneous I/O control registers 708. For example, during an I/O "write" cycle, the address transmitted on the ISA bus 701 is compared with the parameters stored in the miscellaneous I/O control registers 708. If the address falls within the range, 16 bits of the address and 16 bits of the data content are stored in a buffer 607 internal to the I/O capture register 710. An "interrupt" signal then is issued to the digital signal processor 704 and a "ready" signal (also known in the art as a "CHRDY line") is asserted on the ISA bus 701. The "ready" signal remains asserted until the digital signal processor 704 reads the content of the data present in the I/O capture register 710 buffers. In this embodiment, the I/O capture register 710 buffer (not shown) is a single 32 bit buffer on the shared global bus 705. The process is similar for the "read" function. After the "ready" signal is recognized, the digital signal processor 704 performs a data "write" into the internal buffers of the I/O capture register 710.

The miscellaneous I/O control registers 708 and the I/O capture register 710 provide this architecture with flexible functionality and unique capabilities. For example, the MPEG converter 602 is capable of emulating the hardware registers and handshake protocols of most VGA registers and handshake protocols of most VGA circuit boards currently manufactured. In addition, the registers 708 and 710 allow the MPEG converter 601 to process the multiple screens mapped into the windows 703 of the RAM 702. Since operation of the I/O capture register 710 is driven by software resident in the digital signal processor 704, the MPEG converter 602 also has expanded capability to perform numerous unique applications, including others described herein. The I/O capture register also provides flexibility for future growth and eliminates the risk of not having the capability to emulate the correct parameters and protocols of any given VGA vendor.

The MPEG converter has two data output interfaces, which are the SCSI interface 711 and the first-in first-out (FIFO) buffer 712. The SCSI interface 711 is an interface to the SCSI bus 602 (FIG. 6) described above. It provides synchronous data transfer capability at 8-bit SCSI and 16-bit SCSI standards. Typically, the digital signal processor 704 transmits the MPEG data streams to the video server 202 by means of issuing an SCSI "COPY" command. The FIFO buffer 712 outputs data via the ISA bus 701. The FIFO buffer 712 receives sequential data from the digital signal processor 704 and re-transmits the data in the exact order. The FIFO buffer can be used to transmit data to a transmission interface that is also connected to the ISA bus 701, such as a LAN interface. Typically, the FIFO buffer 712 is utilized to output diagnostic or record-keeping data. As an alternative embodiment, the FIFO buffer 712 can output encoded video data to a SCSI interface residing on the ISA bus 701 (not shown).

In operation of the MPEG decoder 602, the systems control computer 206 generates a graphics screen for transmission to room terminal 208 and TV 210 (FIG. 2). The data for the screen previously has been saved on the hard disk of the systems control computer 206. As the graphic screen is generated, it is mapped via the ISA bus 701 onto a bank selectable window 703a–n of the shared global dynamic RAM 702 pertaining to a specific VGA channel. The computer 206 first writes a picture element (PEL) to the bank selectable window 703a–n at a specific address (e.g., 0x03C8 by 0x0000). Based on the appropriate parameter as defined by the miscellaneous I/O control registers 708, the address is captured by the I/O capture register 710 and stored in its buffer (not shown). An "interrupt" signal is issued to the digital signal processor 704 and a ready signal, ("CHRDY line") is issued to the ISA bus 701 halting the operation of the bus. The digital signal processor 704 responds by identifying the bank 703a–n on which the PEL is being written, and then it reads the address captured in the I/O capture register 710 buffer. The digital signal processor 704 resets the selected channel back to "0" and the ISA bus 701 again becomes operational. Subsequently, the systems control computer 206 writes PEL data containing "red-green-blue" (R-G-B) values onto the bank selectable window 703 (e.g., at address 0x3c9) which are similarly captured by the I/O capture register 710 and read by the digital signal processor 704.

Once an entire screen is formed within the bank selectable window 703a–n, the data for the screen are transferred via the shared global bus 705 to the digital signal processor 704 and encoded in MPEG format as described above. After encoding, the screen is copied to the SCSI interface 711 and then is transmitted to the MPEG decoder boards 606 (FIG. 6). As described in FIG. 6, the screen is then decoded into RF format and transmitted to the TV 210.

Thus the operation of the converter 602 enables the system 100 to provide several commercially desirable functions not currently available in the marketplace. The converter 602 operates effectively as a digital switch for assigning selected graphics or screens to selected user channels. Current boards typically can only provide one graphic or screen to one channel. For example, a graphic advertising family entertainment can be generated for a specific user's channel whereas a different graphic advertising adventure entertainment simultaneously can be generated for a different user's channel. Once the graphic or screen has been mapped in a window 703a–n, and then encoded in MPEG in the processor 704, it can then be multiplexed with, or overlaid with, a video program from the disk array 610 in the server 202. For example, the arrangement described could be used to furnish subtitles for merge or overlay onto the presentation of a movie being played from the disk array. Similarly, advertisement graphics can be merged or overlaid on segments of video programming of selected channels. Intelligent programing of the systems control computer 206 can determine the timing, content and selection of channels for providing the overlay or merger of the graphics/screens with the other source programming.

Further, the I/O control registers 708 of the converter 602 are programmable to monitor the ISA bus 701 for a variety of different VGA signal formats and parameters. Accordingly, a separate board does not need to be built for each type of computer or graphics programs, because the converter 602 can emulate all of the various VGA formats.

Figure 8:
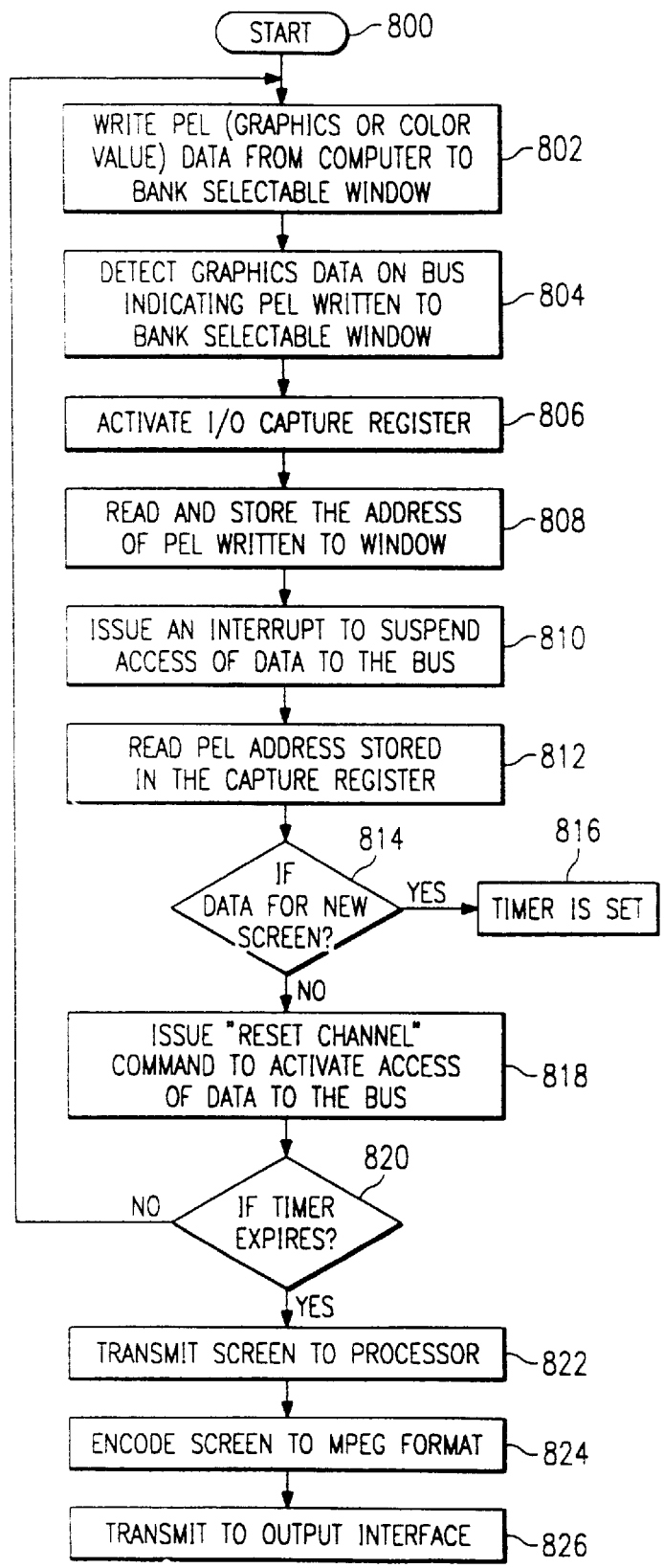
FIG. 8 is a flowchart of the operation of the MPEG converter of FIGS. 6 and 7.

FIG. 8 is a flowchart illustrating the operation of the converter 602. It is understood the functions described are implemented by instructions or logic executed by the processor 704 alone or in conjunction with other components of the converter.

Execution begins at step 800. At step 802 graphics data is written from the systems control computer 206 to one of the bank selectable windows 703a–n. In the first instance, is is understood the data for one PEL is so written (mapped) to an address in the window 703a. Upon completion of the steps described below for this PEL, the process is again performed to write (or map) the color information (R-G-B values) for the PEL. It is understood the data in the computer 206 is from the computer's hard disk and can comprise, for example, graphics or screens such as advertisements, movie subtitles or the like, for display on a selected user channel corresponding to a TV 210.

In step 804, the control registers 708 detect the presence of the graphics data on the ISA bus 701 that was written to the bank selectable window 703a–n. Upon detection, in step 806 the control registers 708 activate the I/O capture registers 710. In step 808 the I/O capture registers 710 reads and stores the address of the PEL written to the window 703a–n. In step 810, the processor 704 issues an interrupt command that suspends access of data to the ISA bus 701. In step 812, the processor 704 reads the address of the PEL stored in the register 710. In step 814, a determination is made whether the address of the data indicates it is the first PEL of a new screen. If yes, in step 816 a timer is set. The timer is used to determine when the mapping of the graphic in the window 703*a–n* is completed. Execution then proceeds to step 818. In step 818, a reset channel command is issued to activate the us for access of data thereto. In step 820 a determination is made if the timer is expired. If not, execution returns to step 802, wherein the color value for the PEL is written to the window 703*a–n*. The process then continues until the timer expires, indicating that all PEL data (graphics and color value) for the particular graphic or screen has been written to the window 703*a–n*.

Thus, if in step 820, the timer has expired, execution proceeds to step 822.

In step 822, the completed graphic or screen stored in the window 703*a–n* is transmitted from the window via the shared global bus to the processor 704 for encoding. The screen is encoded to MPEG format in step 824. After encoded, in step 826 the encoded screen is transmitted to one of two interfaces for output to the video server 202 (FIG. 6). One interface is the SCSI interface 711, which is used when the MPEG converter 602 is directly connected to the internal bus of the video server 202 via a SCSI-II line. Alternatively, the FIFO interface is used when the converter 602 is connected to the video server 202 via a LAN, fiber optic system or other remote transmission arrangement.

Once the screen is transmitted to the server 202, it is then multiplexed or merged with other video programming or data from the disk array 610, as described below with reference to FIG. 9.

Figure 9:
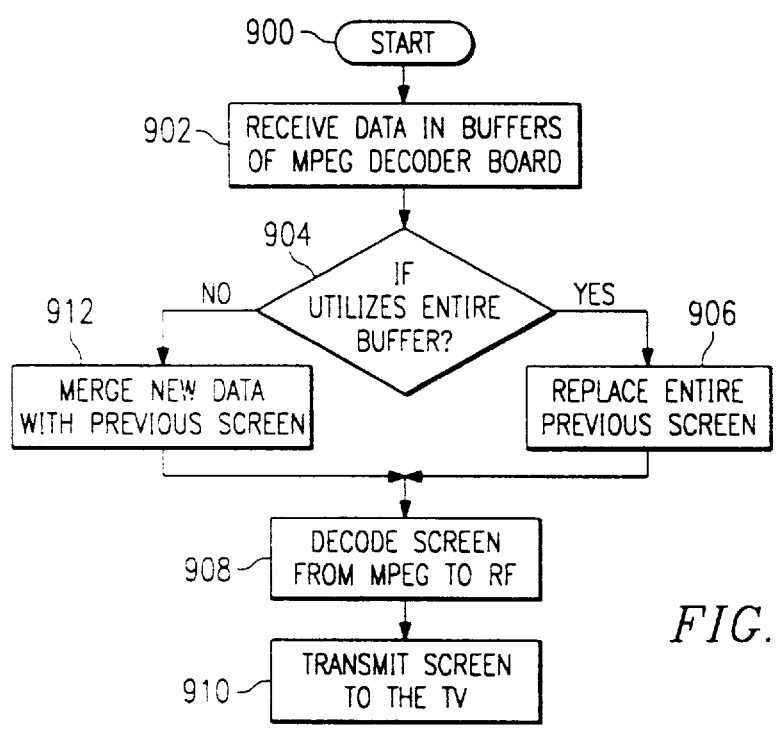
FIG. 9 is a flowchart of the operation of the video server of FIG. 6.

In FIG. 9, a flowchart is depicted of the process for overlaying screens with video programming as performed by the video server 202.

Execution begins in step 900. In step 902, encoded data from the processor 704 is received in the appropriate one of the decoder boards. Each decoder board 606 decodes MPEG-encoded screens for transmission on a specific transmission channel. Specifically, the data is configured in the buffer memory (not shown). In step 904, a determination is made whether the encoded data utilizes the entire buffer 607 of the board 606. When utilizing the entire buffer 607, it is contemplated that the encoded data comprising the screen is intended to be the entire screen of for display on the TV 210. The individual decoder 606 can receive screens from a single source, either from the systems control computer 606 or the disk array 610, or from both sources. When receiving screens from both sources, the decoder 606 functions as a multiplexer, multiplexing both screens onto the same transmission channel. When the entire buffer 607 is not utilized, it is contemplated the encoded data is then to be overlayed onto video programming from the array 610, the data from the video programming (comprising an MPEG screen) thus occupying the remainder of the buffer 607.

In step 906, if the entire buffer 607 of the board 606 is utilized, then the incoming data comprising an MPEG encoded screen (either from the array 610 or the converter 602) replaces in the buffer 607 the previously buffered screen. Execution then proceeds to step 908. In step 908 the completed buffered screen is decoded from MPEG to RF format. In step 910, the decoded screen is transmitted to the TV 210.

If in step 904 the entire buffer 607 of the board 606 is not utilized, then execution proceeds to step 912. As stated above, when the screen does not utilize (i.e., occupy) the entire buffer 607 of the board 606, this means the screen is one that is to be overlayed or merged with a screen from the disk array 610. In step 912, the encoded data from the converter 602 is buffered in the board so that it replaces only the corresponding data of the previously buffered screen of the disk array 610, thereby producing a merged screen. Execution then proceeds to step 908, wherein the completed, merged screen is decoded from MPEG to RF format.

In step 904 above, it is understood that the merging of screen data in the buffer 607 of the board 606 does not necessarily have to be the merger of a screen from the converter 602 with a screen from the array 610. The principal involved can be used to merge two or more different screens from the converter 602. It can also be used to merge screens from sources other than the array 610 with the screens of the converter 602.

The foregoing invention offers numerous commercially advantageous possibilities for combining video data content from different sources. It is contemplated that a user of the system 100 would be able, for example, to watch on a TV 210 a movie or other video program from one source, while simultaneously watching another program (or frozen screens thereof) in a portion or window simultaneously appearing on the TV 210. The content from the separate sources might include video programming or movies, television broadcasts, hospitality or paid advertising, computer generated animation, games, instructional information and and the like.

It is understood that variations may be made in the present invention without departing from the spirit and scope of the invention. For example, the system of the invention can be used in non-hospitality environments and can be used in conjunction with a public switched telephone network for the provision of programming and multiplexing or merging of programming with other data. Application of the present system is contemplated for use with video dialtone or cable television networks. Transmission means other than satellite delivery may be used. Encoded data may be transmitted by any means available, for example, the data may be transmitted by microwave means or over fiber optic transmission means. In addition, the encoded data may be transmitted over public and/or private telecommunications networks. Components of the system may be situated in remote locations and linked by various network configurations. The MPEG decoder boards could be separate units or located as part of a room terminal or TV. The components of the system may be alternatively configured so that they are integrated into single devices or separate devices. Components may comprise integrated circuitry or any combination of discrete or analog circuitry interconnected in a standard manner. Many of the functions may be alternatively implemented in software or hardware logic.

Although illustrative embodiments of the present invention have been shown and described, a latitude of modification, change and substitution is intended in the foregoing disclosure, and in certain instances, some features of the invention will be employed without a corresponding use of other features. Accordingly, it is appropriate that the appended claims be construed broadly and in a manner consistent with the scope of the invention.

What is claimed is:

1. An interactive video services system for enabling the combination of images originating from two or more data sources for delivery on selected transmission channels to selected televisions, the system comprising:

a distribution network for delivering video programming to a plurality of selected televisions over said selected transmission channels;

a systems control computer (SCS) connected to said network for storing and generating digitized data from a first source comprising data screens for presentation on one or more said selected televisions, said first source data screens being stored in a selected window of a memory electrically connected to SCS, said memory having multiple windows each associated with a separate one of said channels, each said window comprising sufficient memory space to store said first source data screen;

converter circuitry electrically connected to said SCS for converting said first source data screens from a first digital format to a second digital format;

a video server (VS) for storing digitized data from a second source comprising data screens for presentation on one or more said selected televisions, said second source data being stored in said second format; and decoder circuitry electrically connected to said SCS and said VS comprising at least one screen buffer for receiving and merging said second format data from said first and second sources, each said buffer for association with a specific transmission channel to one or more said selected televisions, and for converting said merged data to a format suitable for presentation on one or more said selected televisions, whereby said presentation on said one or more said selected televisions appears as a combined image of said first source and second source data.

2. The apparatus of claim 1 wherein said second digital format is a Motion Picture Experts Group (MPEG) format.

3. The apparatus of claim 1 further comprising a disk array connected said video server for storing digitized data, said disk array comprising said second source.

4. The apparatus of claim 1 further comprising a remote distribution center connected via a transmission means to said video server, said center comprising said second source.

5. The apparatus of claim 4 wherein said transmission means comprises a satellite network.

6. The apparatus of claim 1 further comprising:

a remote control unit associated with each said television for generating user command signals;

a room terminal electrically connected to each said television for formatting and storing said user command signals, said room terminal being further connected to said SCS for transmitting said user command signals to said SCS for processing thereby;

wherein said user command signals generated using said remote control unit comprise specific command signals for selecting a desired program of said data from said first or second source or both, and control command signals for controlling presentation of said data on said television by said VS.

7. The system of claim 6 further comprising an intelligent radio frequency (RF) modem connected between said SCS and said room terminal for converting signals generated by said SCS from digital to RF signal format.

8. The system of claim 6 further comprising a frequency modulator responsive to signals from said SCS for tuning the channel of said selected video program to a channel specified by said room terminal.

9. The system of claim 1 wherein said room terminal prevents unauthorized presentation of said digitized video programs on said television.

10. A method for merging screen images originating from at least two different sources and outputting the merged screen images on selected transmission channels to selected televisions, the method comprising:

writing picture element (PEL) data originating from a first source to a selected window of a memory, said memory having multiple windows each associated with a separate one of said channels, each window comprising sufficient memory space to store a first screen comprised of multiple PELs;

subsequent to said writing, encoding said first screen written to said selected window from a first digital format to a second digital format;

providing multiple buffers each of which is associated with a designated one of said channels;

transferring a second screen of data originating from a second source to a selected one of said buffers, said second screen being already encoded in said second format;

transferring said encoded first screen to said selected one of said buffers and merging said encoded first screen with said second screen already in said selected buffer, thereby producing a merged screen in said selected one of said buffers;

decoding said merged screen from said second format to a third format; and transmitting on said selected channel said decoded merged screen for display on said selected television.

11. The method of claim 10 wherein said merged screen comprises graphics from said first source overlaying video programming from said second source.

12. The system of claim 10 wherein said merged screen comprises a window of graphics or video programming from said first source displayed in combination with video programming from said second source.

13. The system of claim 10 wherein said video programming is either full motion or single frames of the program.

14. An interactive video services system for enabling the combination of images originating from two or more data sources for delivery on selected transmission channels to selected televisions, the system comprising:

a distribution network for delivering video programming to a plurality of selected televisions over said selected transmission channels;

a systems control computer (SCS) connected to said network for storing and generating digitized data in a selected digital format from a first source comprising data screens for transmission on a selected channel and presentation on one or more said selected televisions, said first source data screens being stored in a selected window of a memory electrically connected to SCS, said memory having multiple windows each associated with a separate one of said channels, each said window comprising sufficient memory space to store said first source data screen;

a video server (VS) for storing digitized data from a second source comprising data screens for transmission on a selected channel and presentation on one or more said selected televisions, said second source data being stored in the same said selected digital format; and decoder circuitry electrically connected to said SCS and said VS comprising at least one screen buffer for receiving and merging said second format data from said first and second sources, each said buffer for association with a specific transmission channel to one or more said selected televisions, and for converting said merged data to a format suitable for presentation on one or more said selected televisions, whereby said presentation on said one or more said selected televisions appears as a combined image of said first source and second source data.

15. The system of claim 14 further comprising converter circuitry electrically connected to said SCS for converting said first source data screens from said selected digital format to a different selected digital format.

16. The apparatus of claim 14 wherein said selected digital format is a Motion Picture Experts Group (MPEG) format.

17. The apparatus of claim 14 further comprising a disk array connected to said video server for storing digitized data, said disk array comprising said second source.

18. The apparatus of claim 14 further comprising a remote distribution center connected via a transmission means to said video server, said center comprising said second source.

19. The apparatus of claim 18 wherein said transmission means comprises a satellite network.

* * * * *